United States Patent
Susko et al.

(10) Patent No.: US 11,358,501 B2
(45) Date of Patent: Jun. 14, 2022

(54) SEATING ASSEMBLY WITH POWERED OR MANUAL ACTUATION

(71) Applicant: Ford Global Technologies, LLC, Dearborn, MI (US)

(72) Inventors: Thomas J. Susko, Saint Clair Shores, MI (US); Kurt Leon Kormos, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 17/071,662

(22) Filed: Oct. 15, 2020

(65) Prior Publication Data
US 2022/0118889 A1    Apr. 21, 2022

(51) Int. Cl.
*B60N 2/30*   (2006.01)
*B60N 2/005*  (2006.01)
*B60N 2/02*   (2006.01)

(52) U.S. Cl.
CPC ............. *B60N 2/309* (2013.01); *B60N 2/005* (2013.01); *B60N 2/0232* (2013.01); *B60N 2/305* (2013.01); *B60N 2/3009* (2013.01); *B60N 2/3072* (2013.01); *B60N 2002/0236* (2013.01)

(58) Field of Classification Search
CPC ...... B60N 2/309; B60N 2/005; B60N 2/0232; B60N 2/3009; B60N 2/305; B60N 2/3072; B60N 2002/0236
USPC ....................................................... 297/326
See application file for complete search history.

(56) References Cited

U.S. PATENT DOCUMENTS

| | | | | |
|---|---|---|---|---|
| 4,884,843 | A | | 12/1989 | DeRees |
| 5,676,424 | A | * | 10/1997 | Winkelhake ......... B60N 2/1803 297/344.13 |
| 6,488,337 | B1 | * | 12/2002 | De Voss ................ B60N 2/181 248/419 |
| 8,016,354 | B2 | | 9/2011 | Veluswamy et al. |
| 8,496,294 | B2 | * | 7/2013 | Holdampf .............. B60N 2/309 296/65.09 |
| 9,827,879 | B2 | | 11/2017 | Fujita et al. |
| 11,180,055 | B2 | * | 11/2021 | Aktas ................... B60N 2/2213 |
| 11,260,776 | B1 | * | 3/2022 | Aktas ................... B60N 2/0232 |
| 2006/0131946 | A1 | | 6/2006 | Andrigo et al. |
| 2009/0230744 | A1 | * | 9/2009 | Szybisty .............. B60N 2/3065 297/335 |

* cited by examiner

*Primary Examiner* — Mark R Wendell
(74) *Attorney, Agent, or Firm* — Vichit Chea; Price Heneveld LLP

(57) ABSTRACT

A vehicle seating assembly includes a frame movable between a sitting position and a standing position and pivotably coupled to a vehicle floor at a pivotable coupling defining a first axis of rotation. The vehicle seating assembly has a pivot bracket coupled to the vehicle floor, a linkage assembly with a link extending between the pivot bracket and the frame, and a shaft extending through the pivot bracket and the link in a direction transverse to the link, and defining a second axis of rotation. The vehicle assembly also includes a gear assembly with a sector gear and a pinion gear operable to move the sector gear from a first position to a second position, and a pawl assembly coupled to the sector gear and selectively engageable with the shaft to position the shaft in fixed and unfixed positions.

20 Claims, 27 Drawing Sheets

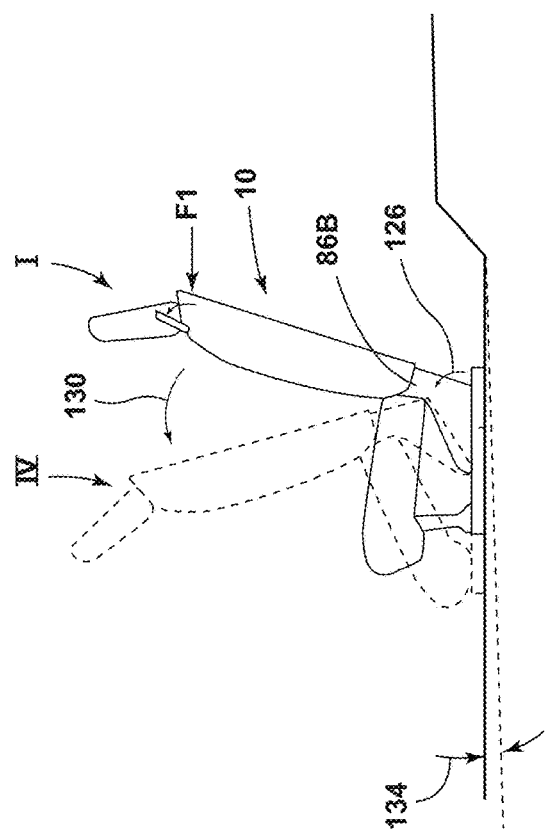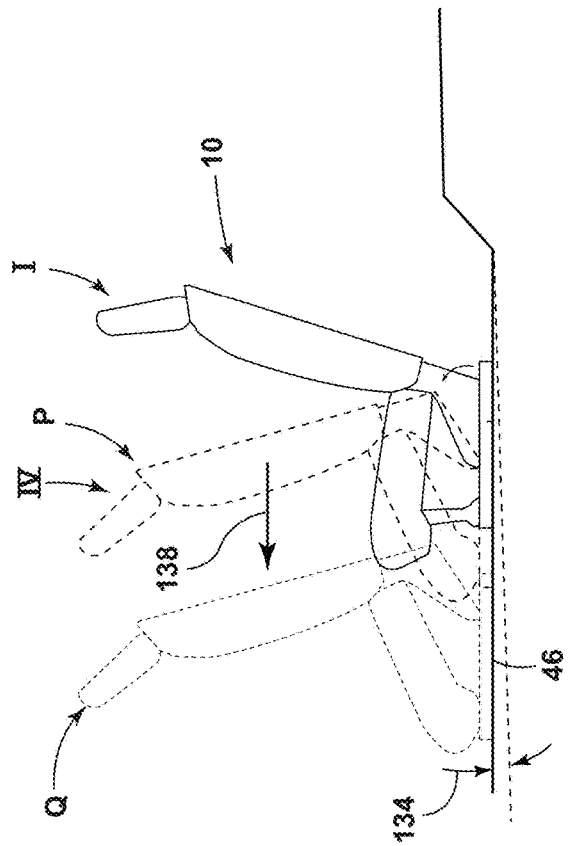

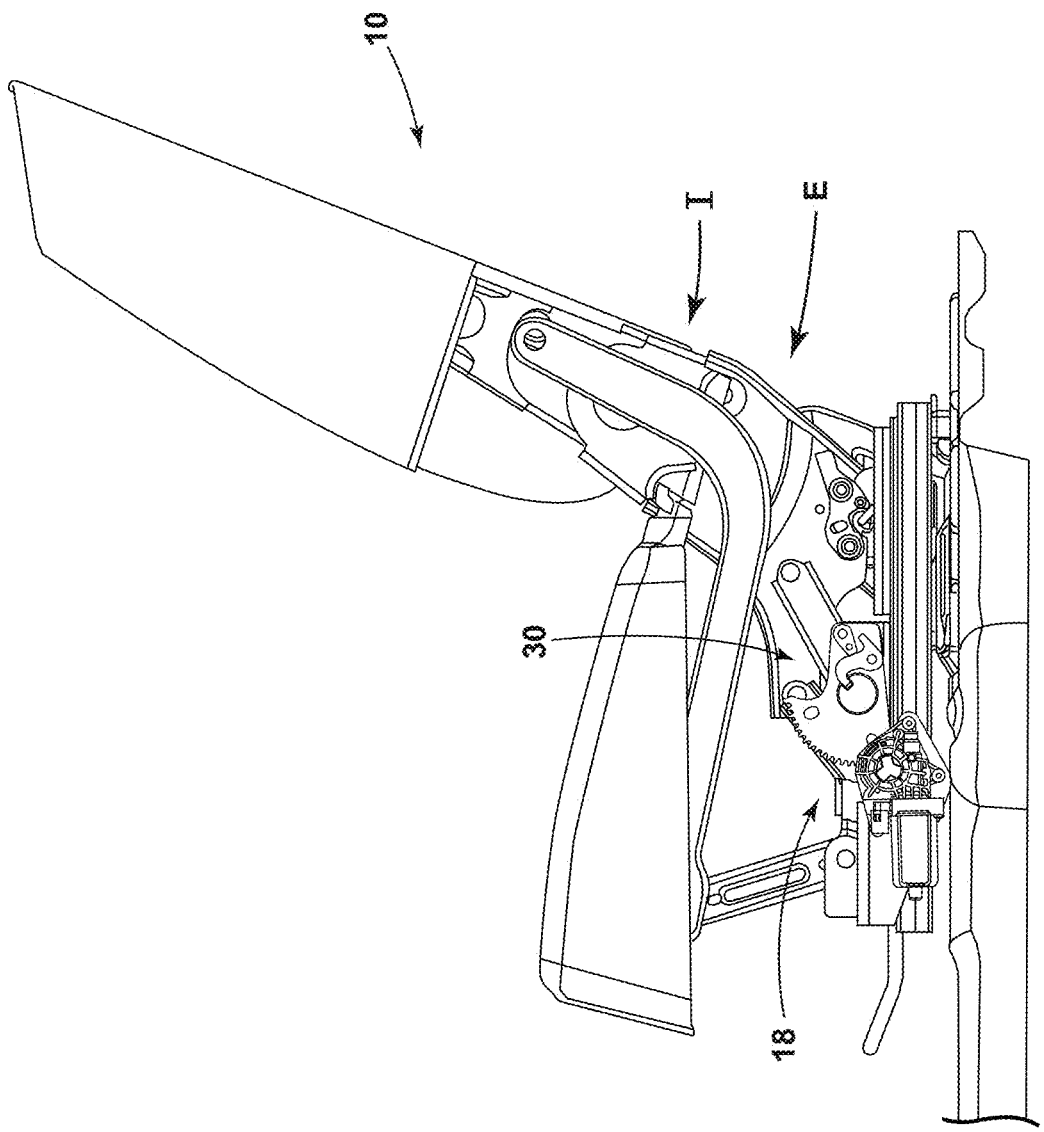

SEATING ASSEMBLY WITH POWERED OR MANUAL ACTUATION

FIELD OF THE DISCLOSURE

The present disclosure generally relates to a vehicle seating assembly, and more specifically to a vehicle seating assembly that may be arranged in various positions.

BACKGROUND OF THE DISCLOSURE

A vehicle seating assembly may have features that may allow the vehicle seating assembly to be arranged in different positions.

SUMMARY OF THE DISCLOSURE

According to one aspect of the present disclosure, a vehicle seating assembly includes a frame movable between a sitting position and a standing position and pivotably coupled to a vehicle floor at a pivotable coupling defining a first axis of rotation. The vehicle seating assembly has a pivot bracket coupled to the vehicle floor, a linkage assembly with a link extending between the pivot bracket and the frame, and a shaft extending through the pivot bracket and the link in a direction transverse to the link, and defining a second axis of rotation. The vehicle seating assembly also includes a gear assembly with a sector gear rotationally coupled to the shaft, a pinion gear operable to move the sector gear from a first position to a second position, and a pawl assembly coupled to the sector gear and selectively engageable with the shaft such that if the pawl assembly is in an engaged position, the shaft is in a fixed position relative to the sector gear, and if the pawl assembly is in the disengaged position, the shaft is in an unfixed position relative to the sector gear.

Embodiments of the first aspect of the disclosure can include any one or a combination of the following features:
- the pawl assembly includes a pawl pivotably coupled to the sector gear and a cam pivotably coupled to the sector gear, wherein a pivotable coupling between the pawl and the sector gear defines a third axis of rotation, and wherein a pivotable coupling between the cam and the sector gear defines a fourth axis of rotation;
- a powered actuator coupled to the pinion gear for moving the sector gear between the first position and the second position while the pawl assembly is in the engaged position to move the frame between the sitting position and the standing position, respectively;
- a manual actuator coupled to the pawl assembly and configured to exert an actuating force on the pawl assembly to move the pawl assembly from the engaged position to the disengaged position and to move the shaft and the link from the fixed position to the unfixed position, respectively;
- the manual actuator includes a cable assembly;
- the shaft extends through a hole in the sector gear;
- a bushing disposed between the shaft and the hole in the sector gear;
- the pawl assembly and the link are disposed on opposing sides of the sector gear;
- the pivot bracket is slidably coupled to a rail disposed proximate the vehicle floor and wherein the frame in the standing position is slidable along the rail between an initial position and a final position; and/or
- the shaft includes a recess for receiving a detent of the pawl when the pawl assembly is in the engaged position.

According to a second aspect of the present disclosure, a lift mechanism for a vehicle seating assembly includes a linkage assembly disposed between the frame and a pivot bracket coupled to a vehicle floor, wherein the linkage assembly is movable between a collapsed position and an extended position to move the frame between a sitting position and a standing position, respectively. The lift mechanism for the vehicle seating assembly also includes a gear assembly with a pinion gear and a sector gear coupled to the linkage assembly, wherein the sector gear is movable between a first position and a second position, and wherein if the linkage assembly is fixedly coupled to the sector gear, then movement of the sector gear from the first position to the second position moves the linkage assembly from the collapsed position to the extended position. A pawl assembly is coupled to the linkage assembly and the sector gear, wherein the pawl assembly is positionable in an engaged position or a disengaged position relative to the linkage assembly, wherein if the sector gear is in the first position, then the pawl assembly is in the disengaged position, and the linkage assembly is movable between a collapsed position and an extended position.

Embodiments of the second aspect of the disclosure can include any one or a combination of the following features:
- a powered actuator rotationally coupled to the pinion gear;
- a manual actuator coupled to the pawl assembly;
- the frame is movable from the sitting position to the standing position by actuating the powered actuator or the manual actuator;
- the linkage assembly includes a link fixedly coupled to a shaft orthogonal to the link;
- a hole disposed in the sector gear, wherein the shaft extends through the hole, wherein the shaft is in a fixed position relative to the sector gear if the pawl assembly is in the engaged position, and wherein the shaft is in an unfixed position relative to the sector gear if the pawl assembly is in the disengaged position; and/or
- the shaft defines an axis of rotation that the sector gear rotates about from the first position to the second position if the pawl assembly is in the engaged position.

According to a third aspect of the present disclosure, a lift mechanism for a vehicle seating assembly includes a linkage assembly with a shaft disposed through a sector gear and a pivot bracket and defining an axis. The linkage assembly also includes a link extending transverse to the shaft and has a first end coupled to the shaft and a second end coupled to a seating assembly frame, wherein the shaft is rotatable between a collapsed position of the linkage assembly and an extended position of the linkage assembly to move the seating assembly from a sitting position to a standing position respectively. A pawl assembly is coupled to the sector gear and positionable in an engaged position relative to the shaft when the linkage assembly is in a collapsed position and a disengaged position relative to the shaft when the shaft is in the extended position.

Embodiments of the third aspect of the disclosure can include any one or a combination of the following features:
- a pinion gear coupled to the sector gear, wherein actuation of the pinion gear moves the sector gear between a first position and a second position, wherein if the pawl assembly is in the engaged position relative to the shaft, then a movement of the sector gear between the first position and the second position moves the seating assembly between the sitting position and the standing position, respectively;

a middle link having a first end coupled to the pivot bracket and a second end coupled to the seating assembly frame; and/or a front link having a first end coupled to the pivot bracket and a second end coupled to the seating assembly frame, wherein the middle link and the front link move between collapsed and extended positions as the seating assembly moves between a sitting position and a standing position.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 3 is left side schematic elevational view of a seating assembly in a sitting position and a standing position, according to an aspect of the disclosure;

FIG. 4 is a left side schematic elevational view of a seating assembly with the seating assembly in the sitting position, the initial standing position, and the final standing position, according to an aspect of the disclosure;

FIG. 6A is a left side elevational view of the seating assembly in the sitting position during powered actuation, according to an aspect of the disclosure;

DETAILED DESCRIPTION

Figure 1:
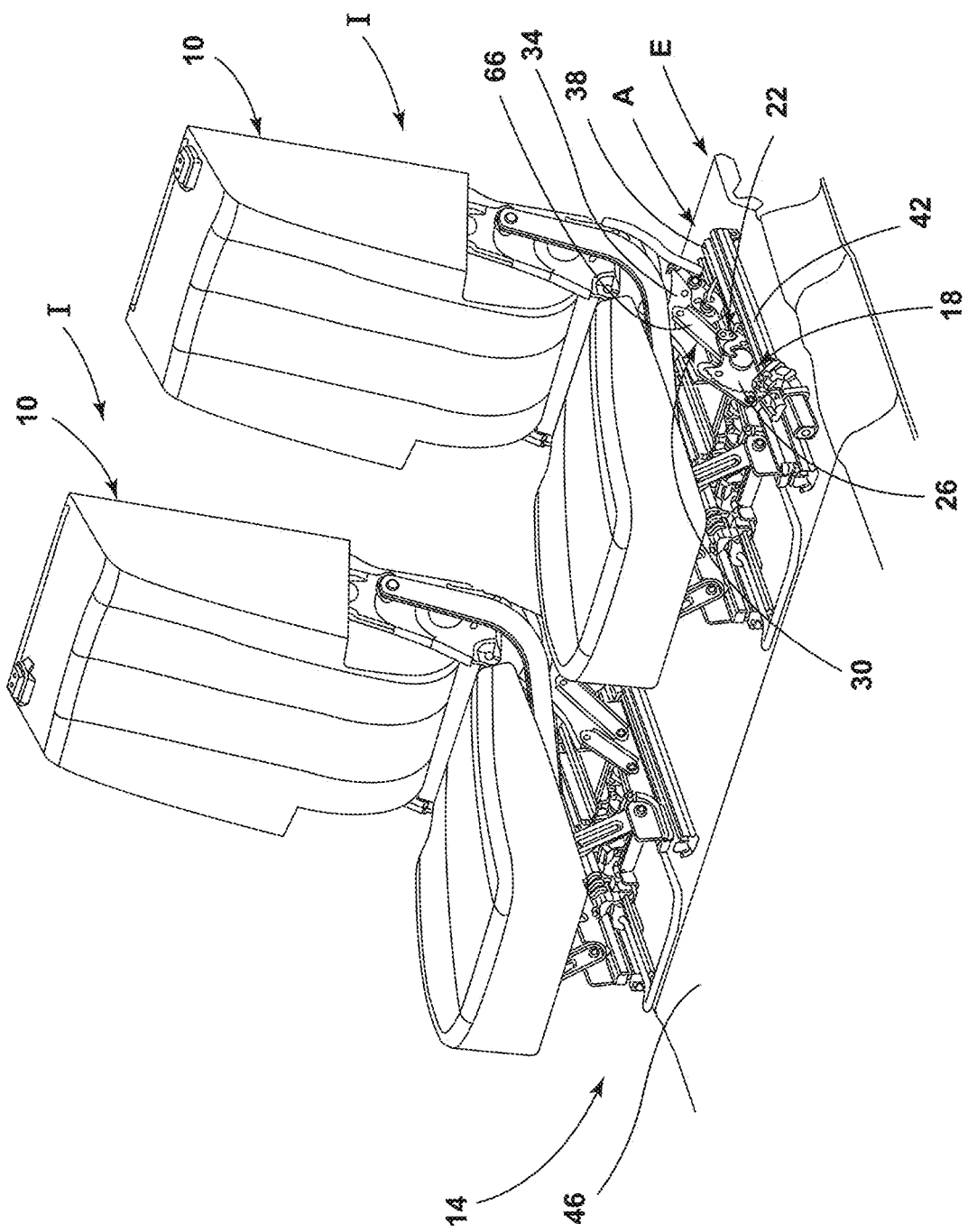
FIG. 1 is a perspective view of two seating assemblies in sitting positions in a vehicle interior, according to an aspect of the disclosure.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to the vehicle seating assemblies described below and shown in the attached figures, a vehicle seating assembly 10 may be described from the vantage point of an occupant seated in the seating assembly 10. The side of a seating assembly 10 disposed on a right side of a seated occupant may be referred to as a right side or a first side of the seating assembly 10. The side of the seating assembly 10 disposed on a left side of a seated occupant may be referred to as a left side or a second side of the seating assembly 10.

Referring now to FIG. 1, a perspective view of two seating assemblies disposed in a vehicle interior 14 is shown. The lift mechanism 18 for the seating assembly 10 is shown on the left side of seating assembly 10. The left seating assembly 10 is in the sitting position I. The lift mechanism 18 may include a pawl assembly 22 disposed on a sector gear 26 of the lift mechanism 18. The pawl assembly 22 is shown in the engaged position A. A linkage assembly 30 may be disposed between the seat frame 34 and the lift mechanism 18. The linkage assembly 30 may include a rear link 66. The linkage assembly 30 is shown in the collapsed position E. The seating assemblies 10 may be coupled to rails 38 disposed in tracks 42 on the vehicle floor 46. The rails 38 may slide within the tracks 42. As such, the seating assemblies 10 may be slidable fore and aft along the vehicle floor 46.

Referring to FIGS. 1-14B, a vehicle seating assembly 10 includes a frame (for example, seating assembly frame 94) movable between a sitting position I and a standing position IV, and pivotably coupled to a vehicle floor 46 at a pivotable coupling 50 defining a first axis of rotation 54. The vehicle seating assembly 10 includes a pivot bracket 58 coupled to the vehicle floor 46, a linkage assembly 30, a gear assembly 62, and a pawl assembly 22. The linkage assembly 30 includes a link (for example, rear link 66) extending between the pivot bracket 58 and the frame (for example, seat frame 34) and a shaft 70 extending through the pivot bracket 58 and the link (for example, rear link 66) in a direction transverse to the link (for example, rear link 66). The shaft 70 defines a second axis of rotation 74. The gear assembly 62 includes a sector gear 26 rotationally coupled to the shaft 70 and a pinion gear 78 operable to move the sector gear 26 from a first position K to a second position L. The pawl assembly 22 is coupled to the sector gear 26. The pawl assembly 22 is selectively engageable with the shaft 70 such that if the pawl assembly 22 is in an engaged position A, the shaft 70 is in a fixed position relative to the sector gear 26. If the pawl assembly 22 is in a disengaged position B, the shaft 70 is in an unfixed position relative to the sector gear 26.

Figure 2:
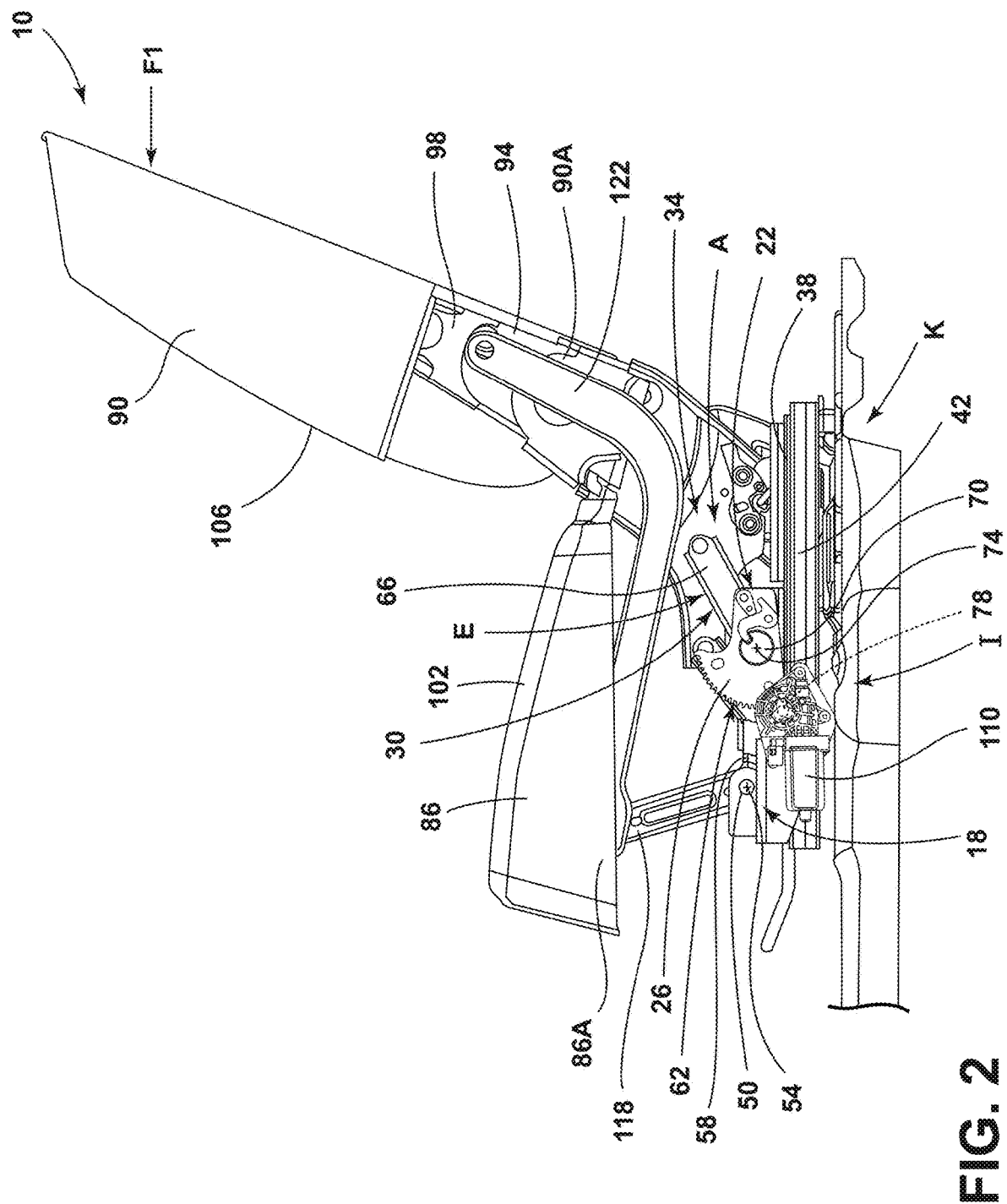
FIG. 2 is a left side elevational view of a seating assembly in a sitting position with a lift mechanism, according to an aspect of the disclosure.

Referring now to FIGS. 2-4, the vehicle seating assembly 10 is shown in the sitting position I. The vehicle seating assembly 10 may include a seat 86 and a seatback 90. The vehicle seating assembly 10 may include a seating assembly frame 94. The seating assembly frame 94 may include a seat frame 34 and a seatback frame 98. A seat cushion 102 or other seating surface may be disposed on the seat 86. A seatback cushion 106 or other seating surface may be disposed on the seatback 90. The lift mechanism 18 is shown in the sitting position I. The lift mechanism 18 may include a gear assembly 62 for powered actuation for moving the seating assembly 10 between a sitting position I and a standing position IV. The gear assembly 62 may include a sector gear 26, a pinion gear 78, and a power actuator 110. The power actuator 110 may rotationally drive the pinion gear 78 to move the sector gear 26. The lift mechanism 18 may include a pawl assembly 22 that may be moved from an engaged position A to a disengaged position B to allow manual movement of the seating assembly 10 from the sitting position I to the standing position IV when a force F1 is applied to the seatback 90. The pawl assembly 22 is shown in the engaged position A. A linkage assembly 30 may be disposed between the seat frame 34 and the rail 38. The linkage assembly 30 may include a rear link 66 fixedly coupled to a shaft 70. The linkage assembly 30 is shown in the collapsed position E. The pawl assembly 22 may move between the engaged position A and the disengaged position B relative to the shaft 70. A middle link 114 may extend between the seat frame 34 and the rail 38. A front link 118 may extend between the seat frame 34 and the rail 38. The front link 118 may be coupled to a curved member 122 of the seat frame 34. The curved member 122 of the seat frame 34 may extend from a forward portion 86A of the seat 86 to a lower portion 90A of the seatback 90.

With continued reference to FIGS. 2-4, the seating assembly 10 is shown in the sitting position I (FIG. 2) and a variety of positions (FIGS. 3-4). Upon detachment of the rear portion 86B of the seat 86 from the vehicle floor 46 (represented by arrow 126), force F1 may be manually exerted on the seating assembly 10 to move the seating assembly 10 from the sitting position I to the standing position IV. Similarly, upon detachment of the rear portion 86B of the seat 86 from the vehicle floor 46 (represented by arrow 126), powered actuation of the seating assembly 10 may take place to move the seating assembly 10 from the sitting position I to the standing position IV. Arrows 134 show a change in the track 42 orientation relative to a substantially horizontal vehicle floor 46 in some examples of the disclosure to allow easier movement of the seating assembly 10 in the standing position IV along the tracks 42.

Referring again to FIGS. 2-4, the seating assembly 10 in the standing position IV may be coupled to the rails 38 and moved along the tracks 42 between an initial position P and a final position Q. Movement of the seating assembly 10 between the initial position P and the final position Q along the tracks 42 is shown by arrow 138.

It may be desirable for passengers to have convenient egress from a vehicle. A seating assembly 10 may be moved from a sitting position I to a standing position IV to provide space for a passenger seated behind the seating assembly 10 to exit the vehicle. Additionally, the seating assembly 10 in the standing position IV may be moved along the vehicle floor 46 from an initial position P to a final position Q to provide additional space for passenger egress. A passenger may conveniently move the seating assembly 10 between the sitting position I and the standing position IV by pressing a button or otherwise engaging with the vehicle to activate a power actuator 110 that moves the seating assembly 10 between the sitting position I and the standing position IV. Alternatively, a passenger may manually move the seating assembly 10 from the sitting position I to the standing position IV. A passenger may manually move the seating assembly 10 if power is not available or if the passenger prefers manual actuation to power actuation.

Figure 5:
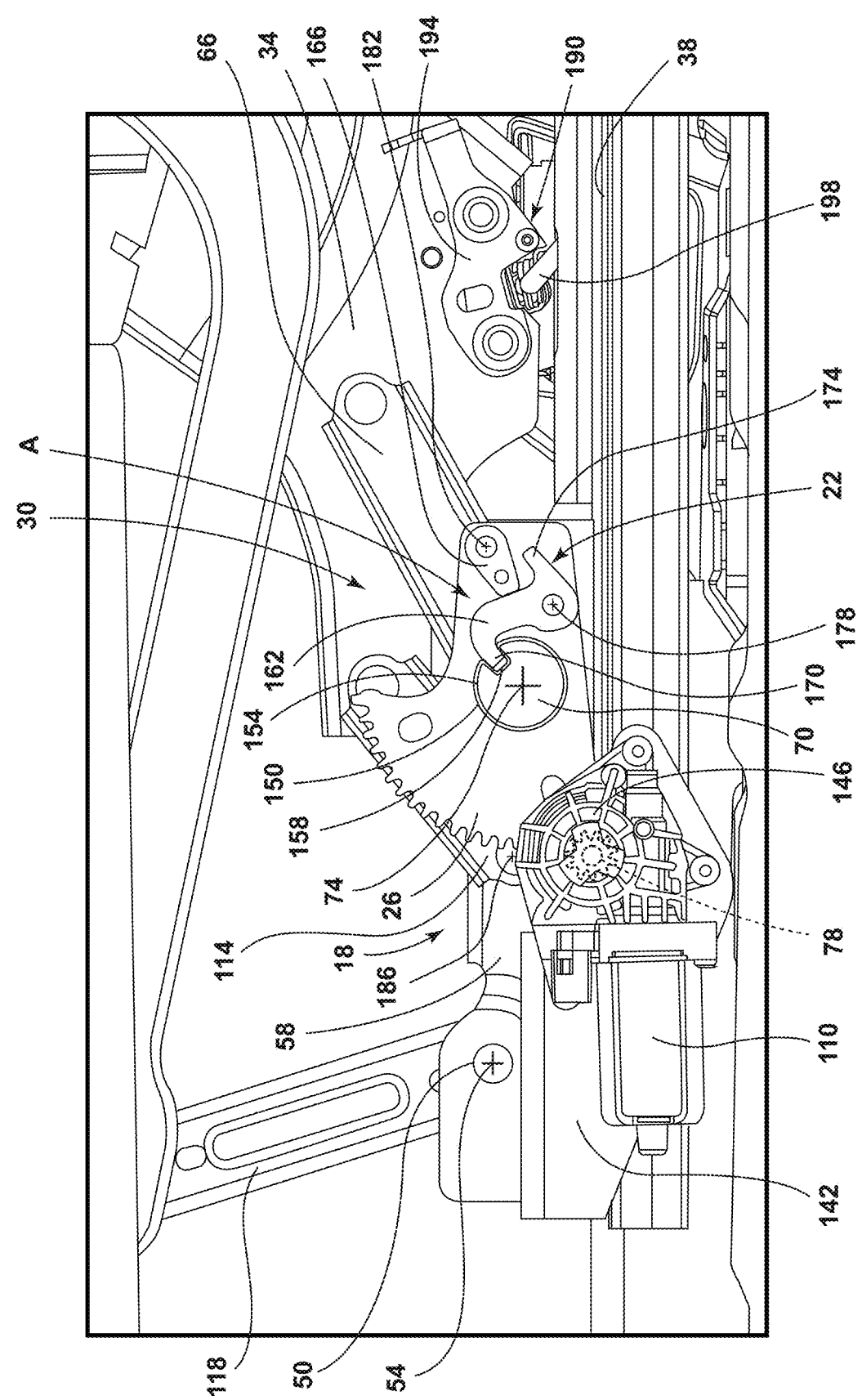
FIG. 5 is a left side elevational view of the seating assembly in the sitting position, according to an aspect of the disclosure.

With reference now to FIG. 5, a side elevational view of the lift mechanism 18 is shown. The power actuator 110 may be coupled to the motor bracket 142. The motor bracket 142 may be fixed to the rail 38. The power actuator 110 may include a gear box 146. The gear box 146 may include the pinion gear 78. The pinion gear 78 may be rotatable to drive the sector gear 26. The pivot bracket 58 may be coupled to the rail 38. The linkage assembly 30 may be coupled with the sector gear 26. The linkage assembly 30 may include the rear link 66 and the shaft 70. The shaft 70 may be disposed transverse to the rear link 66. The shaft 70 may extend into a hole 150 in the sector gear 26. A bushing 154 may be disposed between the hole 150 and the shaft 70. The shaft 70 may include a recess 158. The pawl assembly 22 may be coupled to the sector gear 26. The pawl assembly 22 may include a pawl 162 and a cam 166. The pawl 162 may include a detent 170. The detent 170 may be disposed in the recess 158 when the pawl assembly 22 is in the engaged position A. The pawl 162 may include a pawl leg 174.

With continued reference to FIG. 5, several axes of rotation are shown. The pivotable coupling 50 between the pivot bracket 58 and the front link 118 may define an axis of rotation 54. The shaft 70 may define an axis of rotation 74. An axis of rotation 178 may extend through the pivotable coupling between the pawl 162 and the sector gear 26. An axis of rotation 182 may extend through the pivotable coupling between the cam 166 and the sector gear 26. An axis of rotation 186 may extend through the middle link 114 and the pivot bracket 58.

A latch assembly 190 is shown in FIG. 5. The latch assembly 190 may be disposed between the seat frame 34 and the rail 38. The latch assembly 190 may include a latch 194 and a striker 198. The latch 194 may be coupled to the seat frame 34. The striker 198 may be coupled to the rail 38. When the seating assembly 10 is in the sitting position I, then the latch 194 may be engaged with the striker 198 to secure the seating assembly 10 to the vehicle floor 46. When the seating assembly 10 is in a sitting position I, an intermediate position (first intermediate position II or second intermediate position III), or the standing position IV, then the latch 194 may be released from the striker 198. The latch 194 may be released from the striker 198 to allow the seating assembly 10 to pivot around the axis of rotation 54 between the sitting position I and the standing position IV.

Figure 6B:
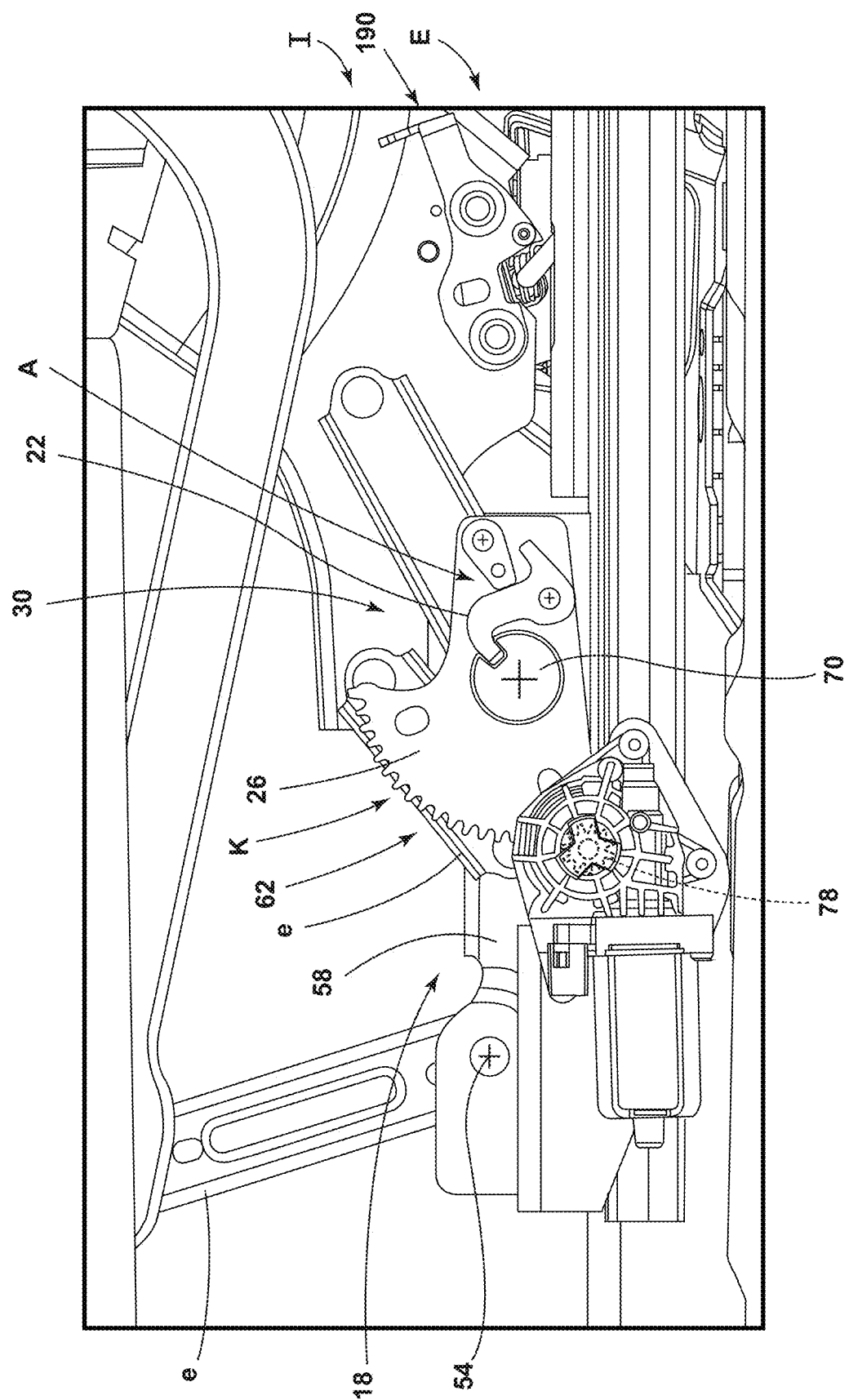
FIG. 6B is a left side elevational view of the lift mechanism portion of the seating assembly in the sitting position of FIG. 6A, according to an aspect of the disclosure.

Referring now to FIGS. 6A-9B, the seating assembly 10 is shown moving from the sitting position I to the standing position IV due to powered actuation. FIGS. 6A-6B show the seating assembly 10 in a sitting position I. The gear assembly 62 may include the pinion gear 78 and the sector gear 26. The sector gear 26 is shown in the first position K. The shaft 70 may extend through the sector gear 26 and the pivot bracket 58 to couple the sector gear 26 to the linkage assembly 30. The sector gear 26 may move between a first position K and a second position L (FIGS. 9A-9B) while the linkage assembly 30 is fixedly coupled to the sector gear 26 by the pawl assembly 22 in the engaged position A. As the sector gear 26 moves from the first position K to the second position L (FIGS. 9A-9B), the linkage assembly 30 may move from the collapsed position E to the first intermediate extended position F (FIG. 7B). The front link 118 and the middle link 114 are shown in the collapsed positions e. The pawl assembly 22 may be coupled to the sector gear 26. The pawl assembly 22 may be in a fixed position relative to the shaft 70 because the detent 170 is engaged with the recess 158. Throughout powered actuation of the lift mechanism 18 to move the lift mechanism 18 between the sitting position I and the standing position IV, the pawl assembly 22 generally remains in the engaged position A. The latch assembly 190 may be engaged if the seating assembly 10 is in the sitting position I. The latch assembly 190 may be disengaged to allow the seating assembly 10 to pivot around the axis of rotation 54.

Figure 7A:
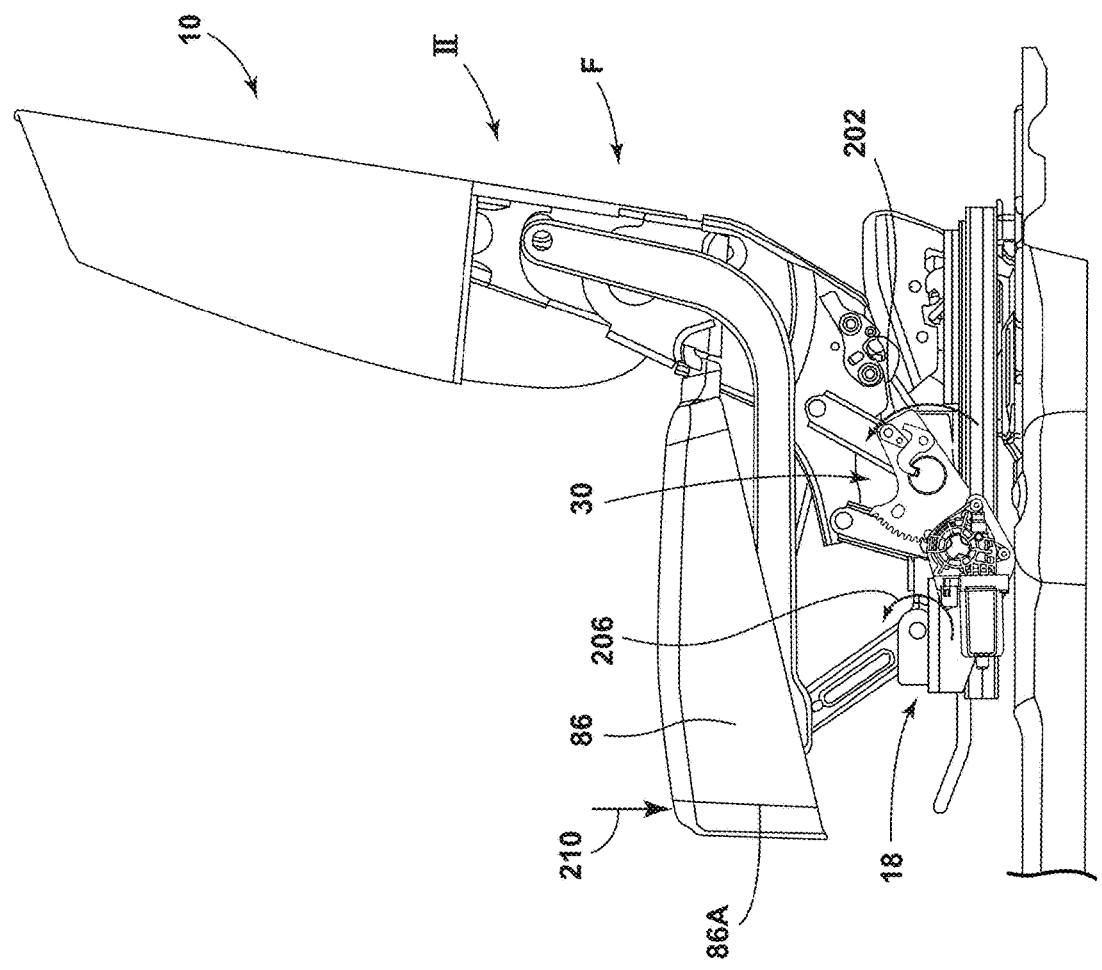
FIG. 7A is a left side elevational view of the seating assembly in a first intermediate position during powered actuation, according to an aspect of the disclosure.
Figure 7B:
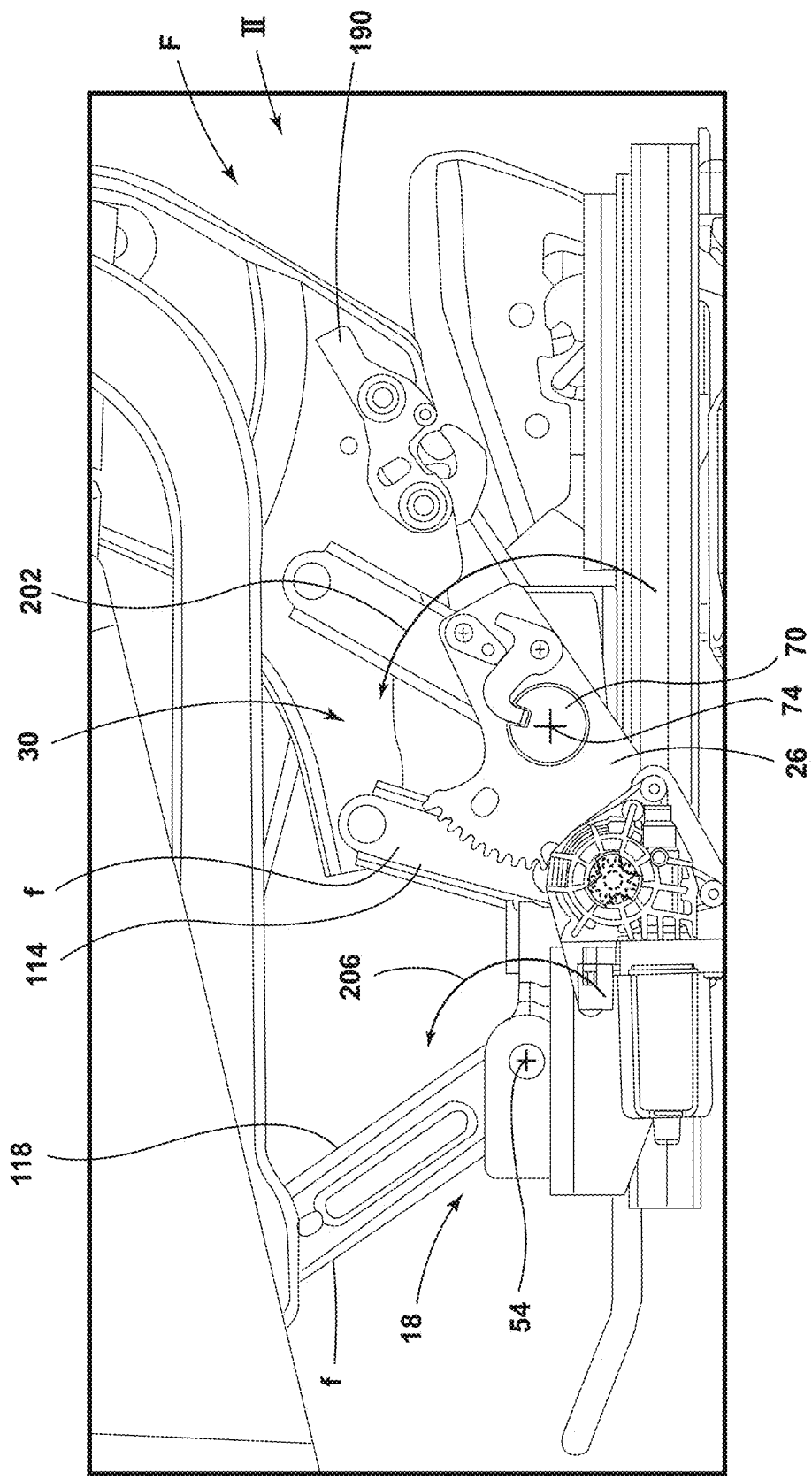
FIG. 7B is a left side elevational view of the lift mechanism portion of the seating assembly in a first intermediate position of FIG. 7A, according to an aspect of the disclosure.

With reference now to FIGS. 7A and 7B, the seating assembly 10 is shown in the first intermediate position II. The linkage assembly 30 has moved from the collapsed position E to a first intermediate collapsed position F. The front link 118 and the middle link 114 have also moved from the collapsed positions e to the first intermediate collapsed positions f. The sector gear 26 has rotated in the direction shown by arrow 202 about the axis of rotation 74 of the shaft 70 to cause the front link 118 to rotate in the direction shown by arrow 206 about the axis of rotation 54. The forward portion 86A of the seat 86 has moved downward in the direction shown by arrow 210. The latch assembly 190 may be disengaged.

Figure 8A:
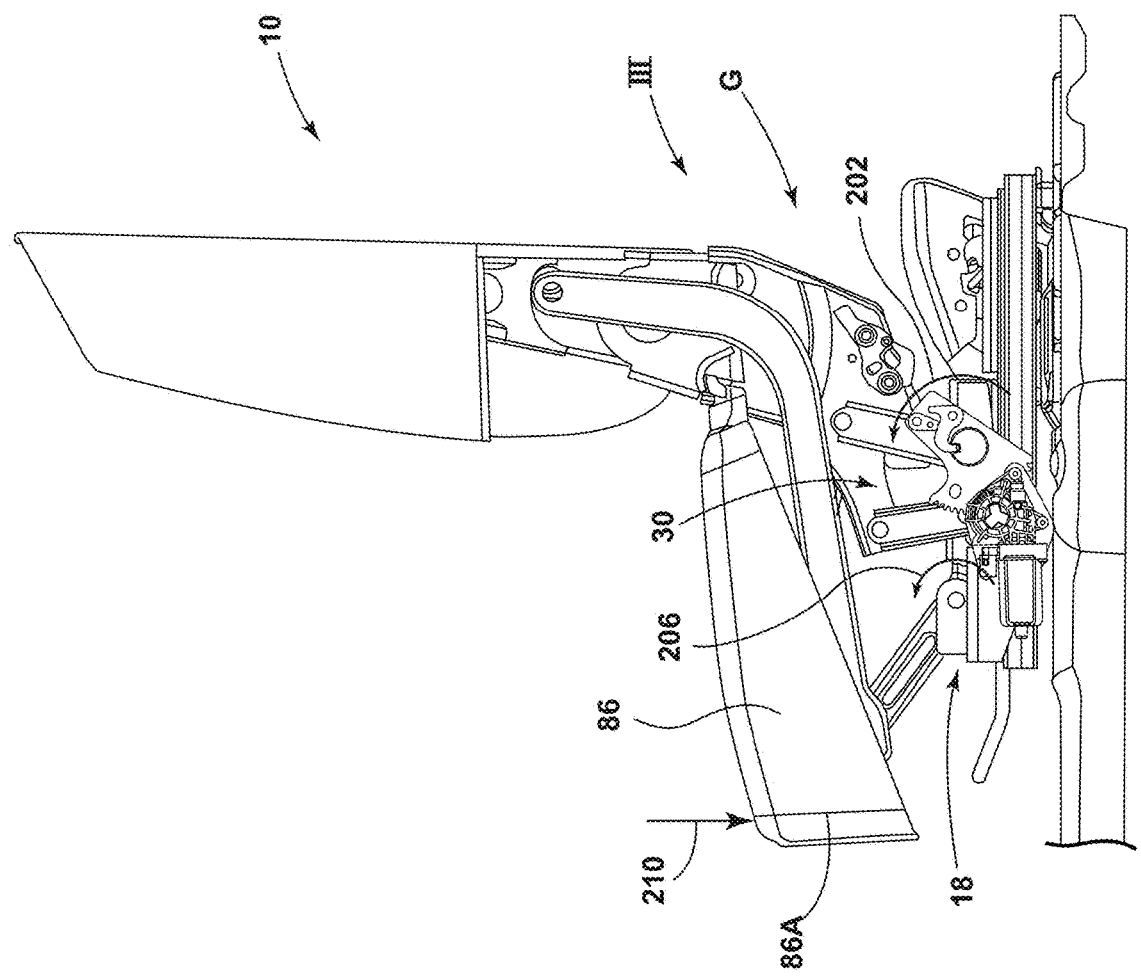
FIG. 8A is a left side elevational view of the seating assembly in a second intermediate position during powered actuation, according to an aspect of the disclosure.
Figure 8B:
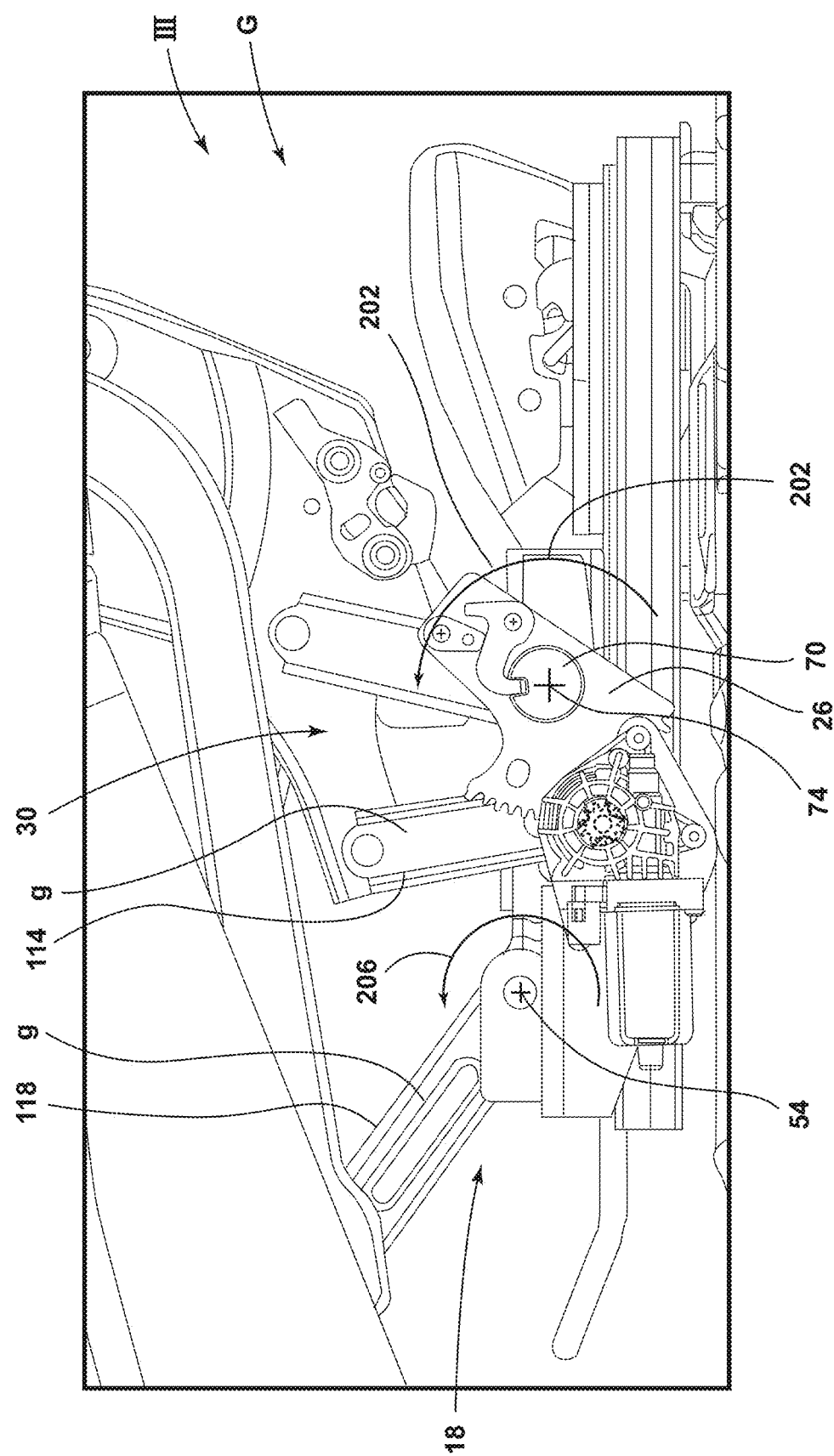
FIG. 8B is a left side elevational view of the lift mechanism portion of the seating assembly in a second intermediate position of FIG. 8A, according to an aspect of the disclosure.

Referring to FIGS. 8A and 8B, the seating assembly 10 is shown in the second intermediate position III. The linkage assembly 30 has moved from the first intermediate collapsed position F to the second intermediate collapsed position G. The front link 118 and the middle link 114 have also moved from the first intermediate collapsed position f to the second intermediate collapsed positions g. The sector gear 26 has rotated in the direction shown by arrow 202 about the axis of rotation 74 of the shaft 70 to cause the front link 118 to rotate in the direction shown by arrow 206 about the axis of rotation 54. The forward portion 86A of the seat 86 has moved downward in the direction shown by arrow 210.

Figure 9A:
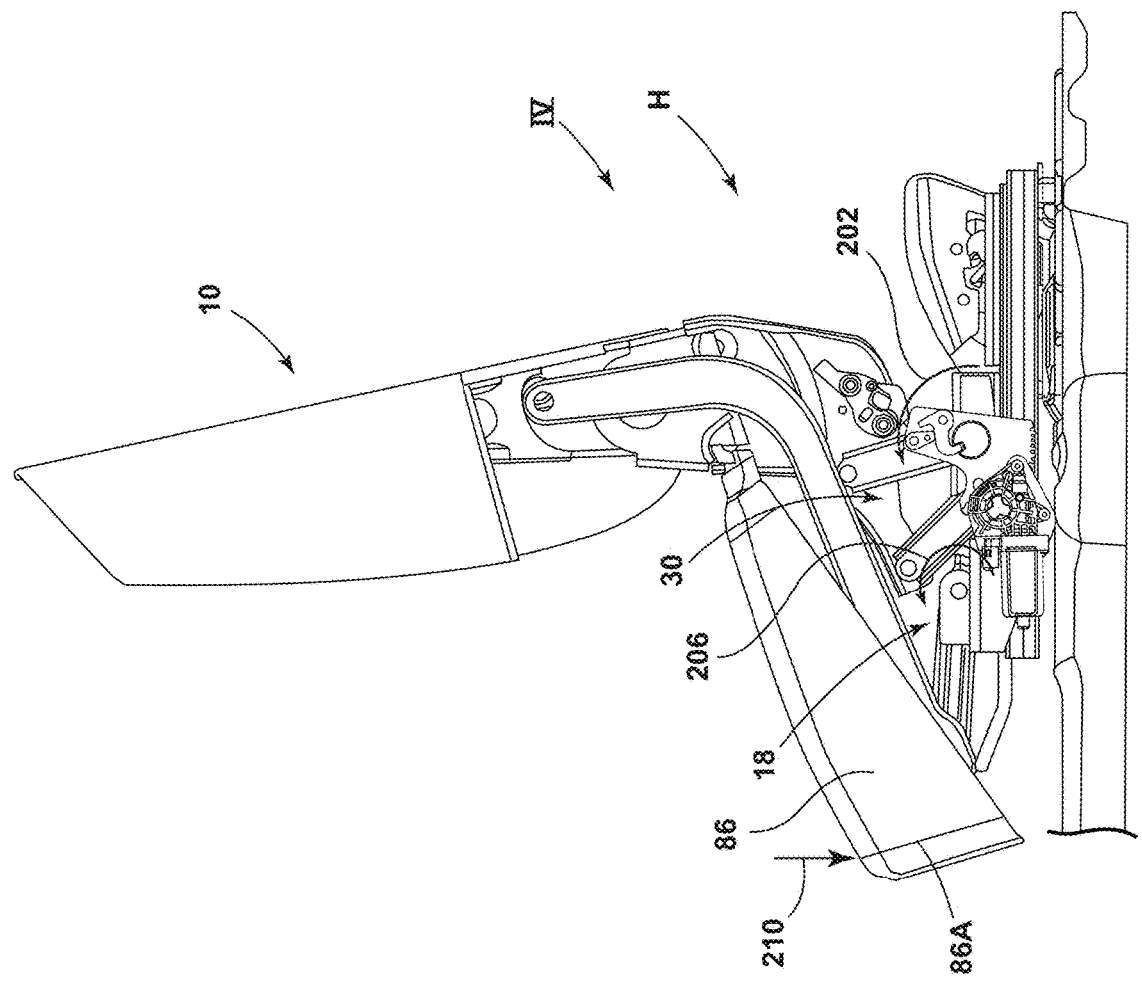
FIG. 9A is a left side elevational view of the seating assembly in a standing position during powered actuation, according to an aspect of the disclosure.
Figure 9B:
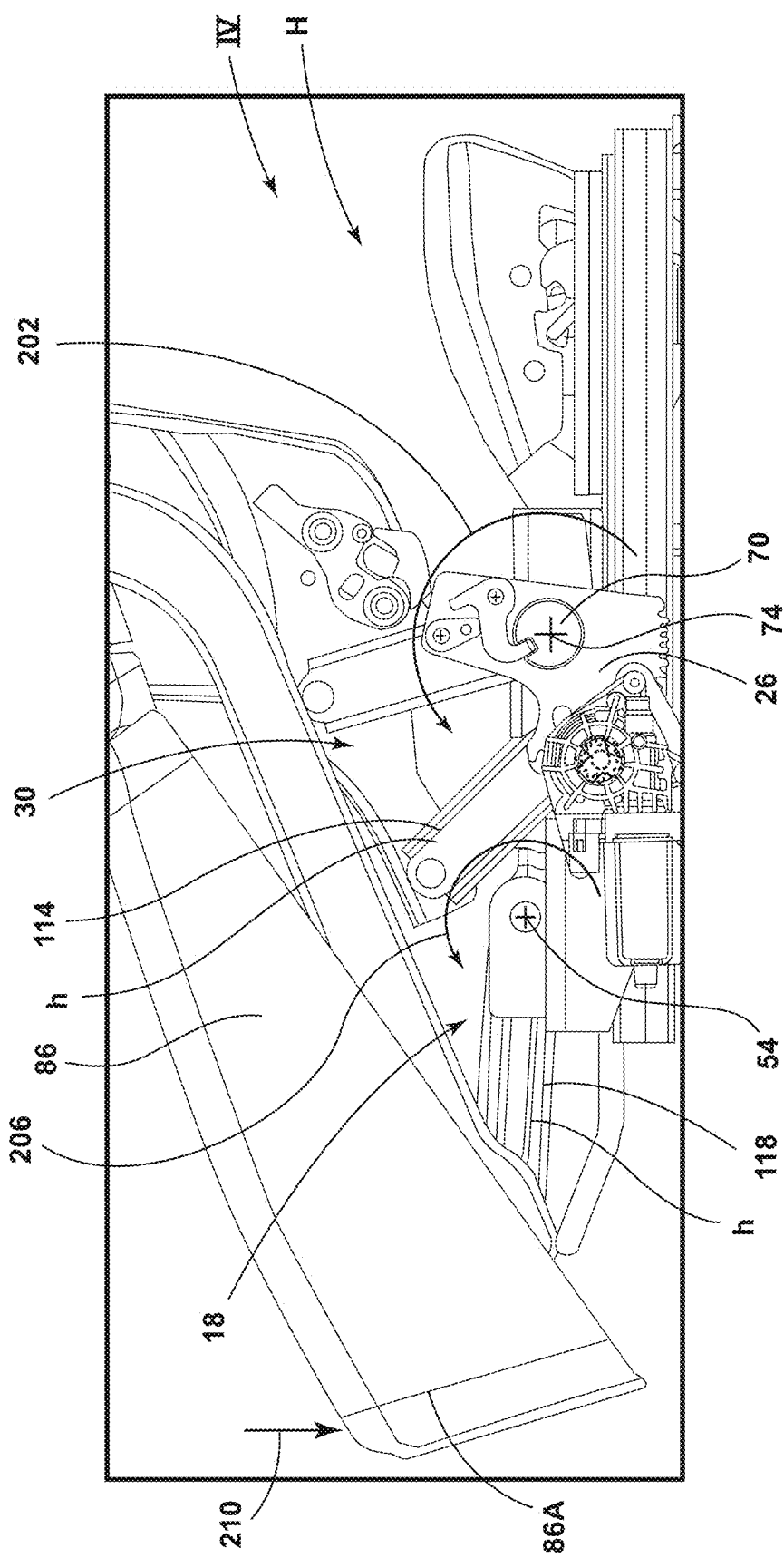
FIG. 9B is a left side elevational view of a lift mechanism portion of the seating assembly of FIG. 9A, according to an aspect of the disclosure.

Referring to FIGS. 9A and 9B, the seating assembly 10 is shown in the standing position IV. The linkage assembly 30 has moved from the second intermediate collapsed position G to the extended position H. The front link 118 and the middle link 114 have also moved from second intermediate collapsed positions g to extended positions h. The sector gear 26 has rotated in the direction shown by arrow 202 about the axis of rotation 74 of the shaft 70 to cause the front link 118 to rotate in the direction shown by arrow 206 about the axis of rotation 74. The forward portion 86A of the seat 86 has moved downward in the direction shown by arrow 210.

As such, FIGS. 6A-9B show how the seating assembly 10 moves from the sitting position I to the standing position IV during powered actuation of the lift mechanism 18. It is to be understood that the seating assembly 10 may be moved from the standing position IV to the sitting position I using powered actuation in a reverse sequence of the movements shown in FIGS. 6A-9B.

Figure 10A:
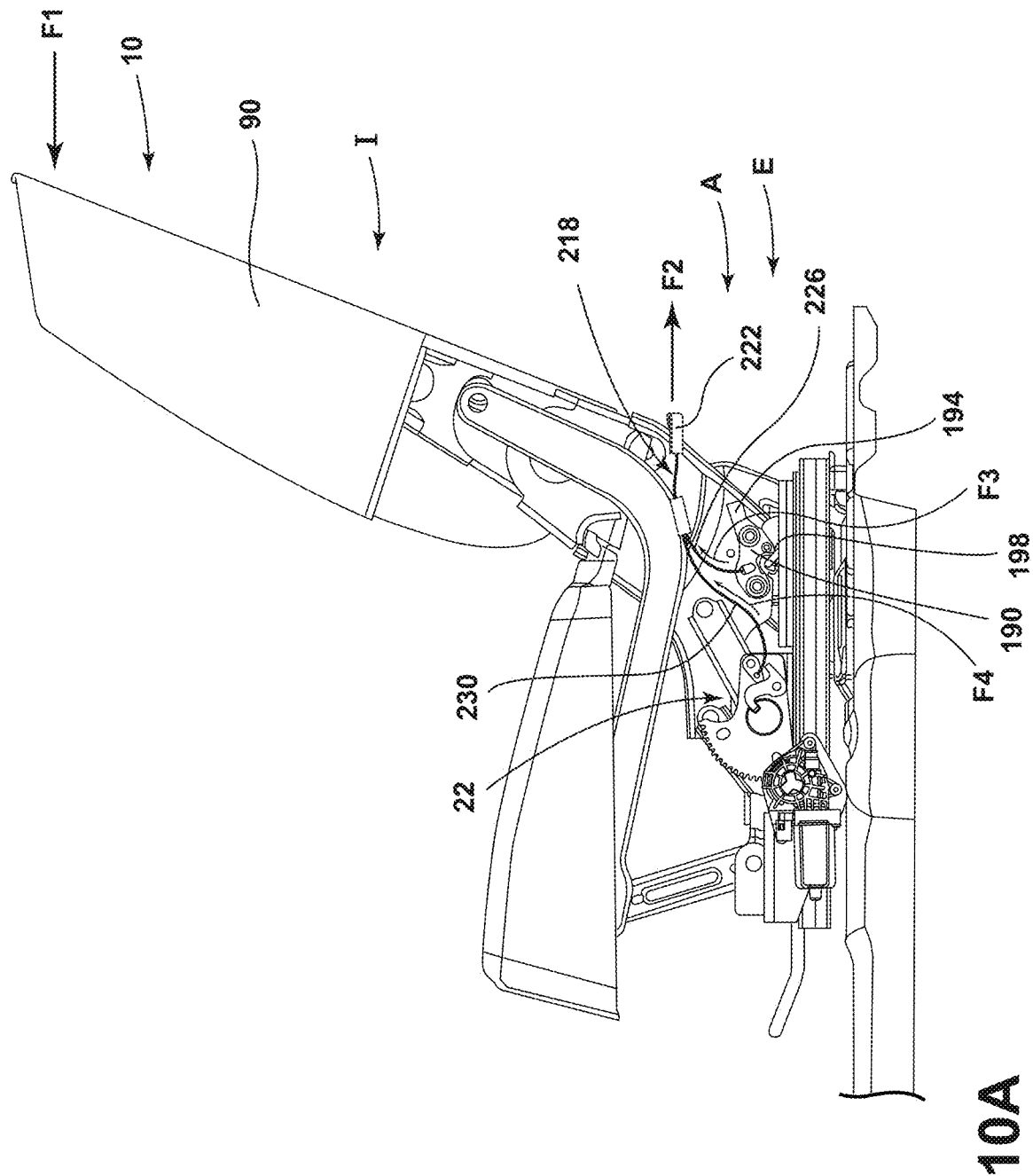
FIG. 10A is a left side elevational view of the seating assembly in the sitting position during manual actuation with a cable assembly, according to an aspect of the disclosure.
Figure 10B:
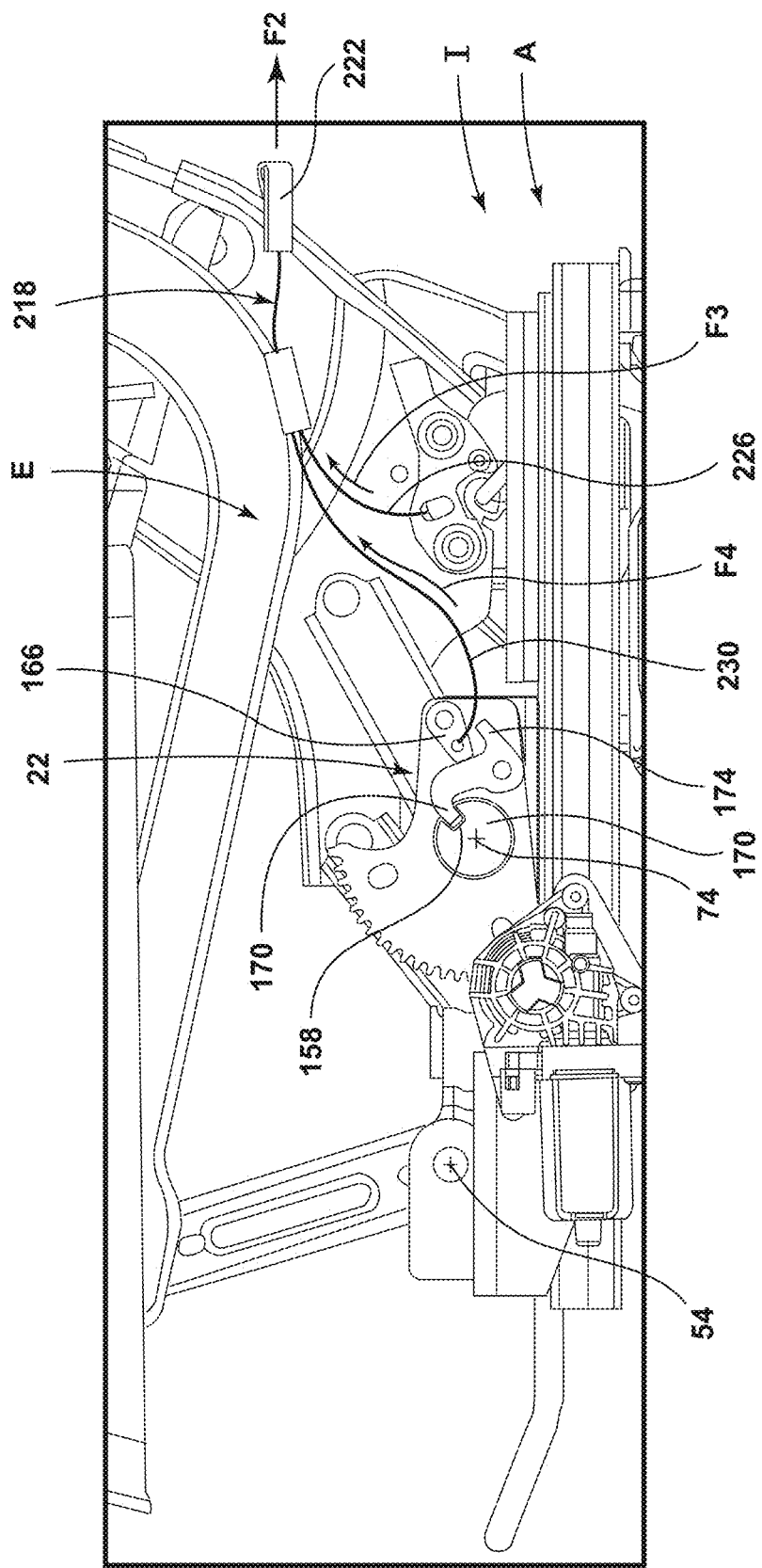
FIG. 10B is a left side elevational view of the lift mechanism portion of the seating assembly in the sitting position of FIG. 10A, according to an aspect of the disclosure.

It may be desirable to use manual actuation when powered actuation is not available (for example, when the vehicle does not have power or when the power actuator 110 component is broken). FIGS. 10A-10B show the seating assembly 10 in the sitting position I with the manual actuator. The manual actuator may include a cable assembly 218. The cable assembly 218 may include a pull member 222 that may be disposed behind the seatback 90. A force F2 may be exerted on the pull member 222 to exert a force F3 on a latch cable 226 coupled to the latch assembly 190 to release the latch 194 from the striker 198. The force F2 may also exert a force F4 on the cam cable 230 coupled to the pawl assembly 22 to move the pawl assembly 22 from the engaged position A to the disengaged position B. The force F4 exerted on the cam 166 may cause the cam 166 to move toward the pawl leg 174 to remove the pawl detent 170 from the recess 158 in the shaft 70. As the passenger exerts a force F2 on the pull member 222, the passenger may exert a force F1 on the seating assembly 10 to push the seatback 90 forward and to rotate the seating assembly 10 about the axis of rotation 54.

Referring now to FIGS. 11A-14B, the seating assembly 10 of FIGS. 10-10B is shown in various positions without the cable assembly 218.

Figure 11A:
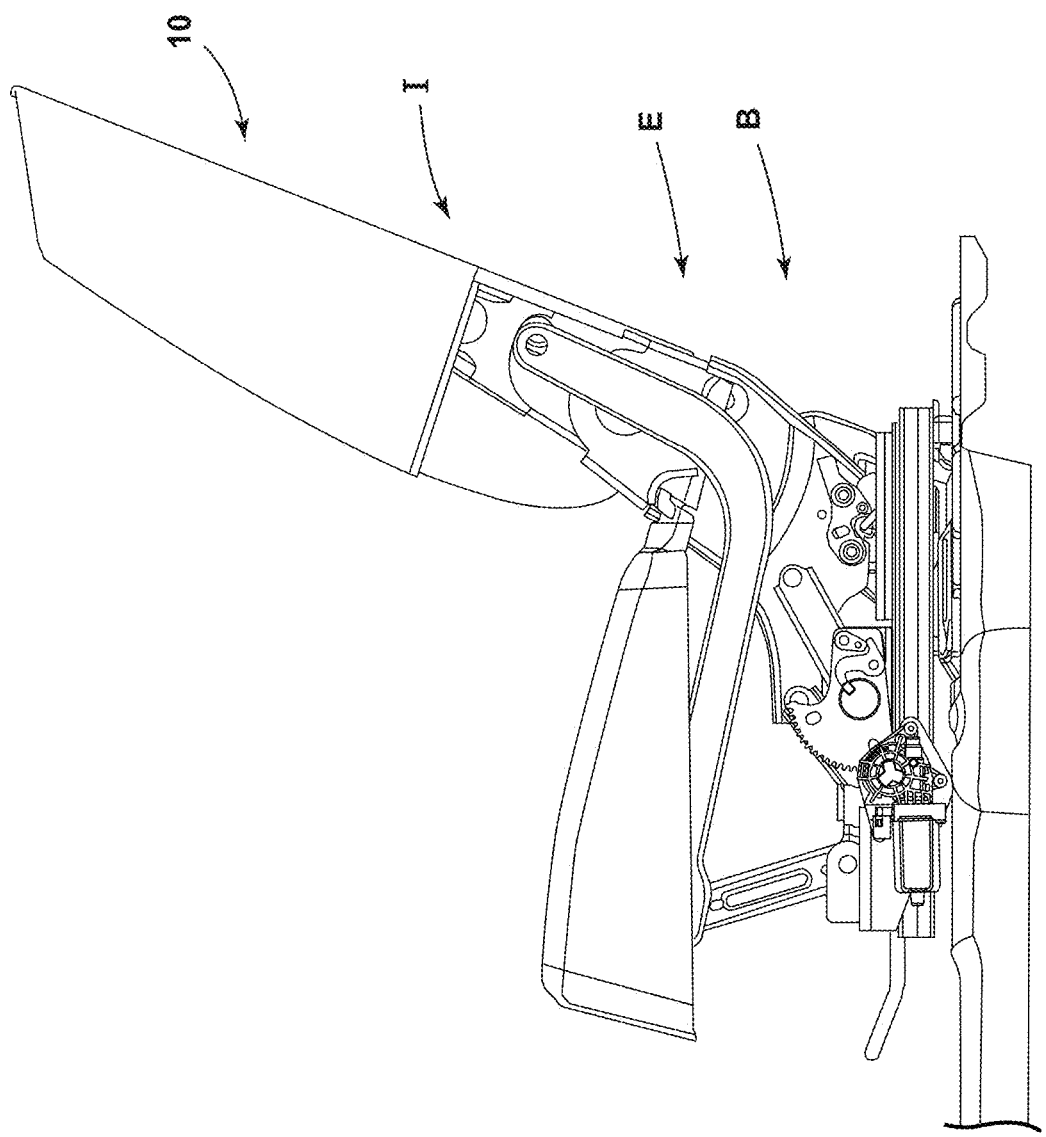
FIG. 11A is a left side elevational view of the seating assembly in the sitting position with the pawl assembly in the disengaged position during manual actuation, according to an aspect of the disclosure.
Figure 11B:
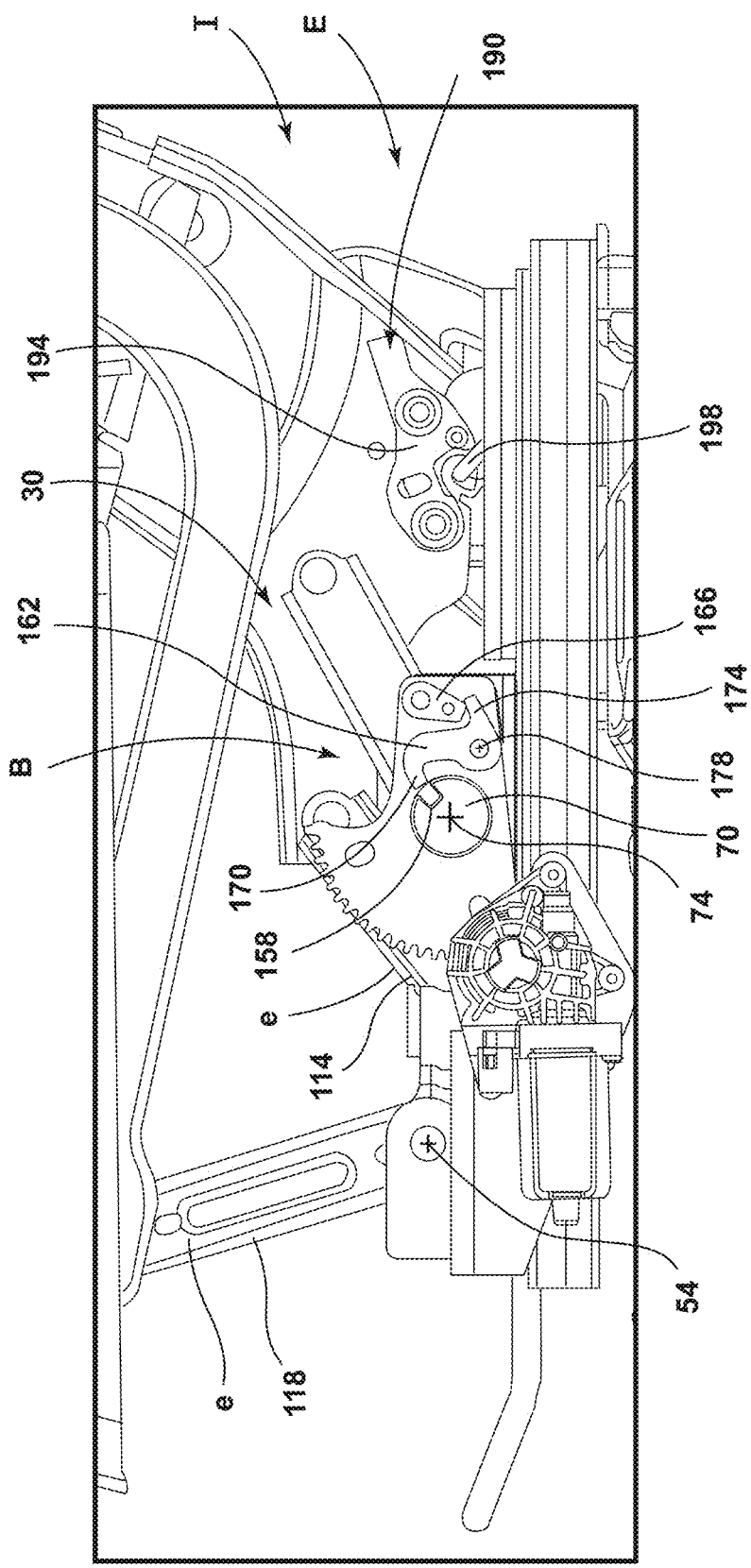
FIG. 11B is a left side elevational view of the lift mechanism portion of the seating assembly in the sitting position with the pawl assembly in the disengaged position of FIG. 11A, according to an aspect of the disclosure.

FIGS. 11A-11B show the seating assembly 10 in the sitting position I. A force F4 has been exerted on the cable assembly 218 to move the cam 166 from the center of the pawl 162 to the leg 174 of the pawl 162 to cause the pawl 162 to rotate about the axis of rotation 178 to disengage the pawl detent 170 from the recess 158 of the shaft 70. The linkage assembly 30 is shown in the collapsed position E. The front link 118 and the middle link 114 are shown in the collapsed positions e. A force F3 has also been exerted on the latch assembly 190 to disengage the latch 194 from the striker 198.

Figure 12A:
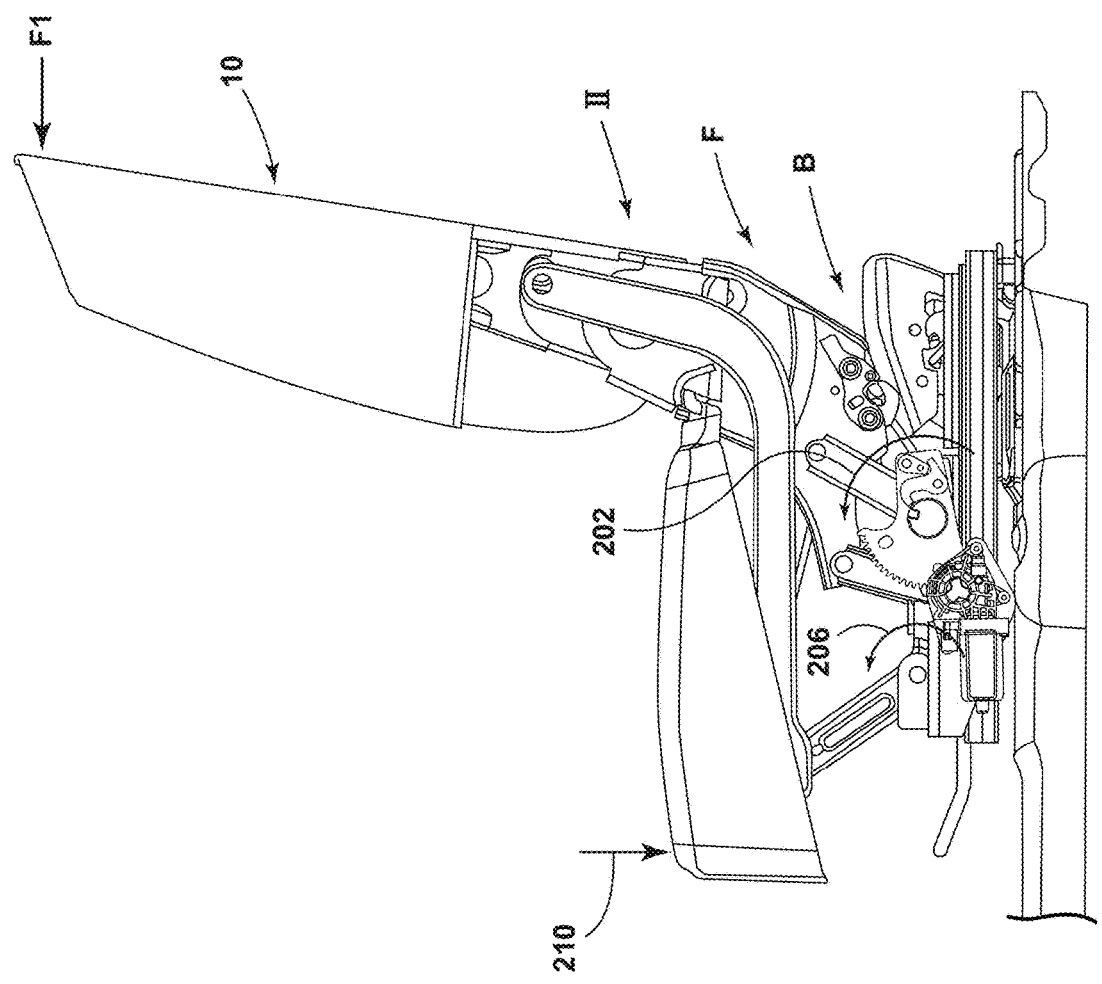
FIG. 12A is a left side elevational view of the seating assembly in a first intermediate position with the pawl assembly in the disengaged position during manual actuation, according to an aspect of the disclosure.
Figure 12B:
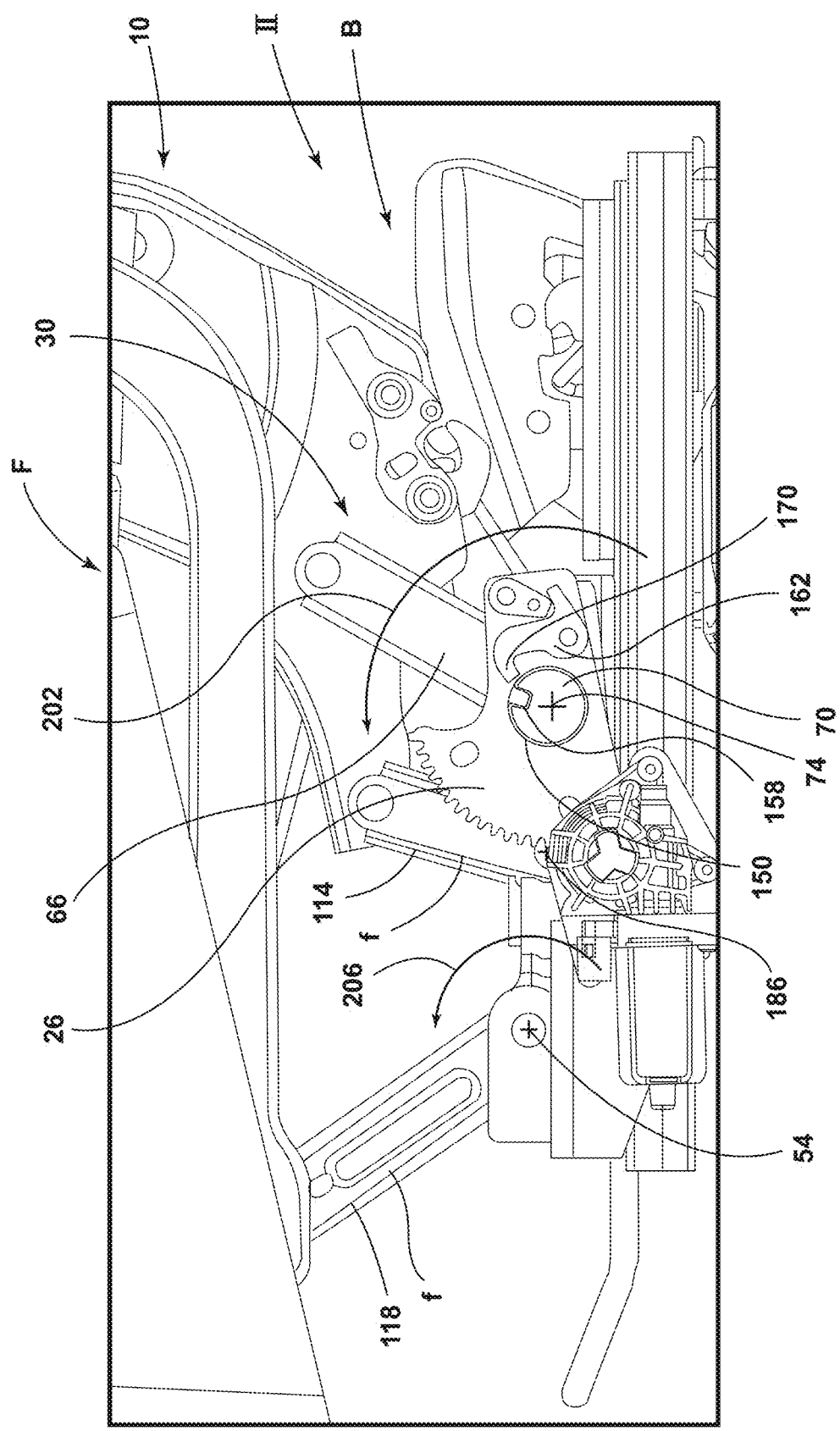
FIG. 12B is a left side elevational view of the lift mechanism portion of the seating assembly in the first intermediate position with the pawl assembly in the disengaged position of FIG. 12A, according to an aspect of the disclosure.

FIGS. 12A-12B show the seating assembly 10 in a first intermediate position II. The shaft 70 of the linkage assembly 30 has rotated in the direction shown by arrow 202 and thus moves the recess 158 of the shaft 70 away from the detent 170. The detent 170 may remain adjacent to the outer surface of the shaft 70 during rotation of the shaft in the hole 150 of the sector gear 26 due to a biasing mechanism or spring disposed around the pawl 162. The rear link 66 of the linkage assembly 30 has moved from the collapsed position E to the first intermediate collapsed position F. The front link 118 may rotate around the axis of rotation 54 in the direction shown by arrow 206 from the collapsed position e to the first intermediate collapsed position f. The passenger may continue to apply a force F1 to the seating assembly 10 to rotate the shaft 70 around the axis of rotation 74 in the direction shown by arrow 202. The middle link 114 may rotate around the axis of rotation 186 from the collapsed position e to the first intermediate collapsed position f.

Figure 13A:
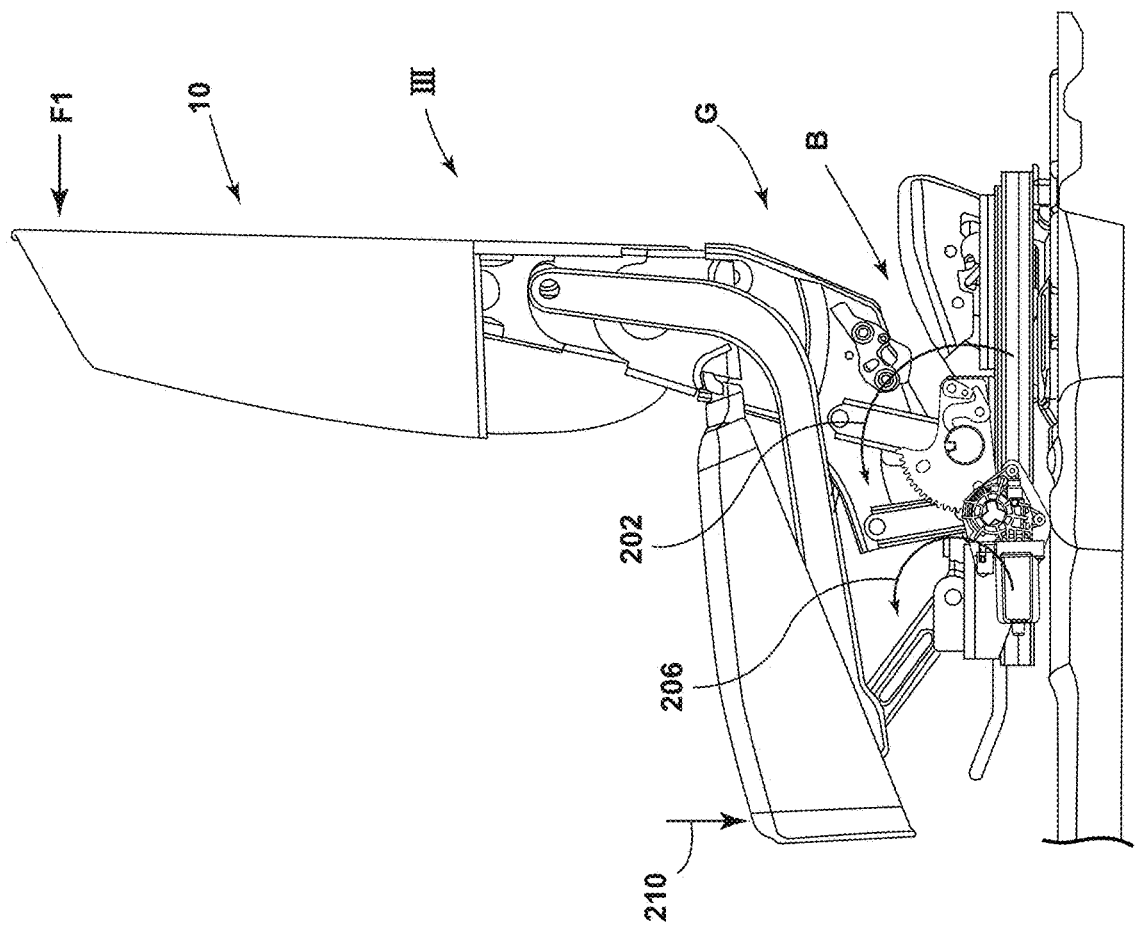
FIG. 13A is a left side elevational view of the seating assembly in a second intermediate position with the pawl assembly in the disengaged position during manual actuation, according to an aspect of the disclosure.
Figure 13B:
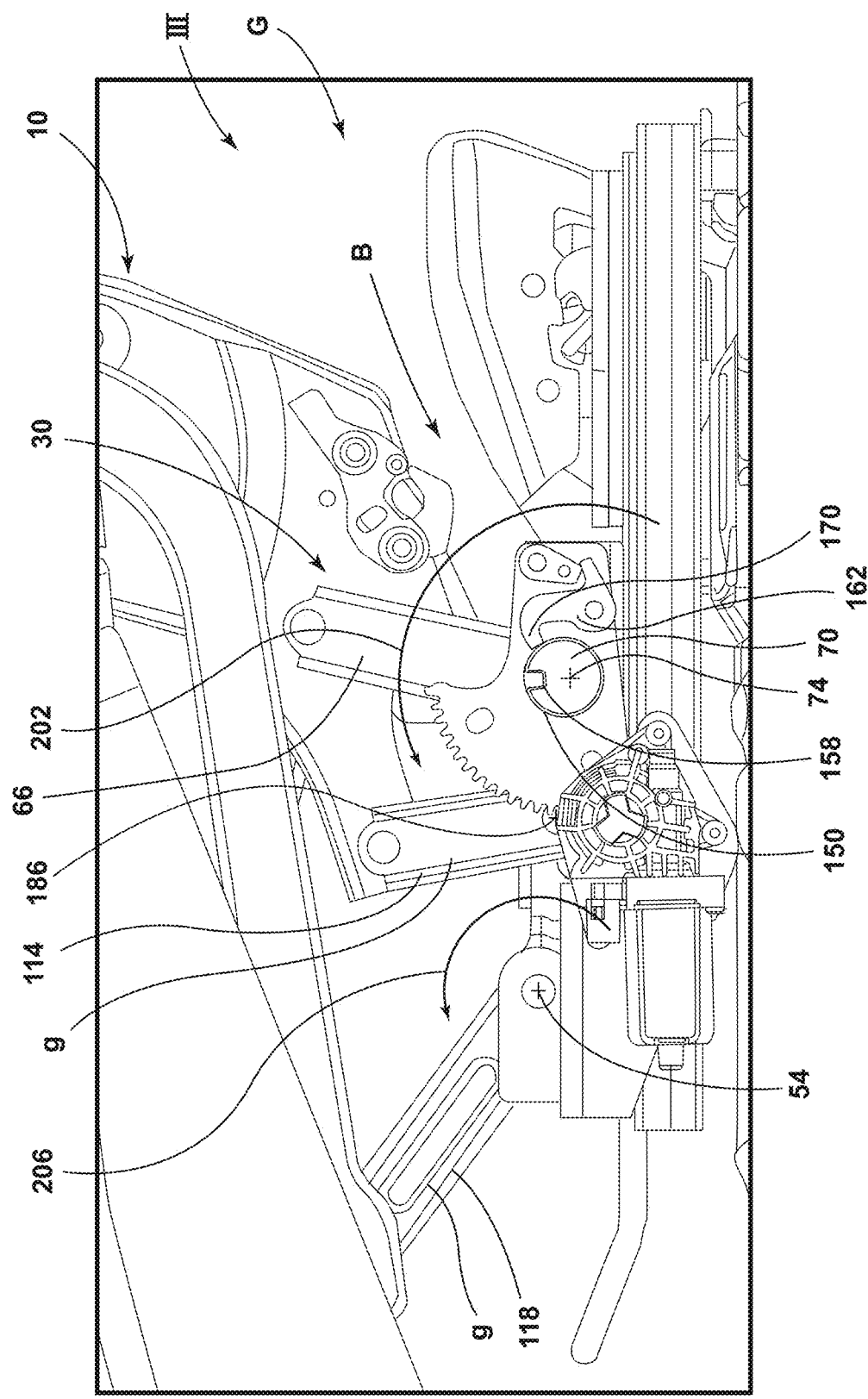
FIG. 13B is a left side elevational view of the lift mechanism portion of the seating assembly in a second intermediate position with the pawl assembly in the disengaged position of FIG. 13A, according to an aspect of the disclosure.

FIGS. 13A-13B show the seating assembly 10 in a second intermediate position III. The shaft 70 of the linkage assembly 30 has rotated to move the recess 158 of the shaft 70 further away from the detent 170. The rear link 66 of the linkage assembly 30 has moved from the first intermediate collapsed position F to the second intermediate collapsed position G. The shaft 70 may rotate around the axis of rotation 54 in the direction shown by arrow 206 to rotate the front link 118 from the first intermediate position f to the second intermediate position g. The passenger may continue to apply a force F1 to the seating assembly 10 to rotate the shaft 70. The middle link 114 may rotate around the axis of rotation 186 from the first intermediate collapsed position f to the second intermediate collapsed position g.

Figure 14A:
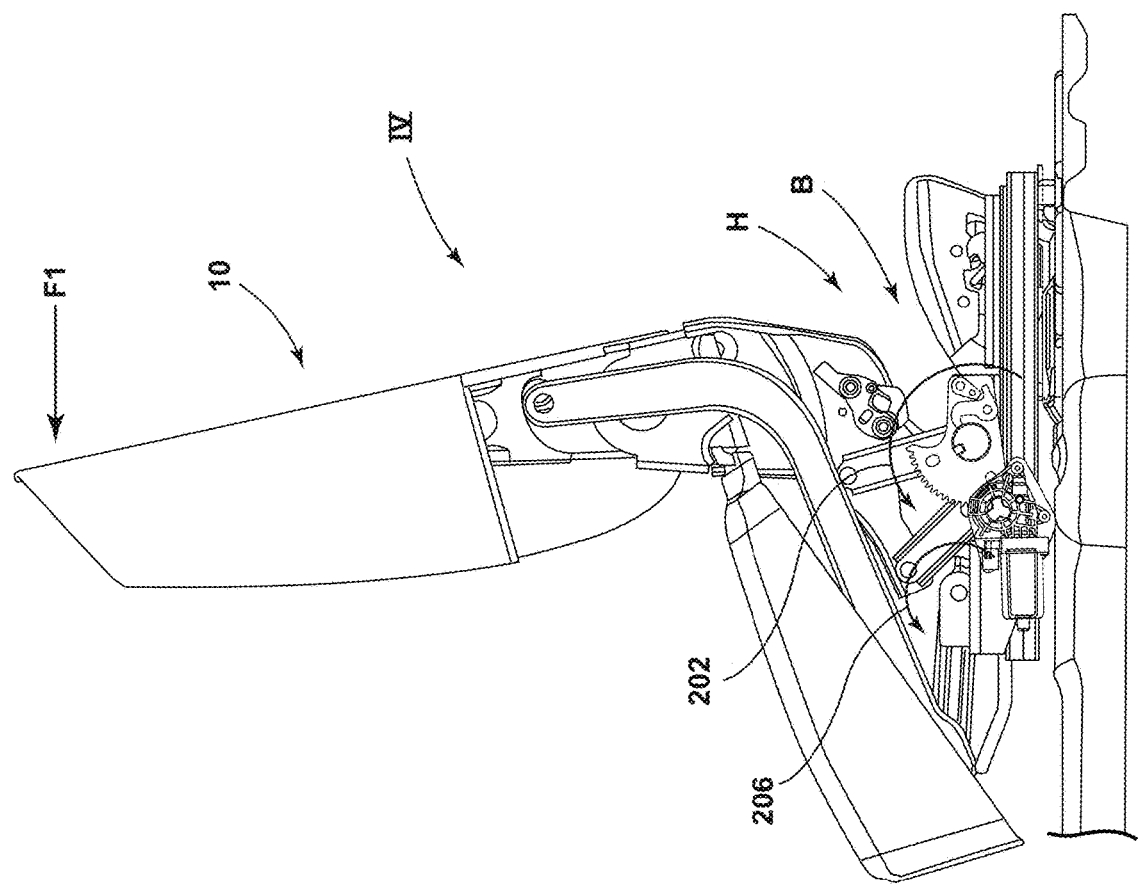
FIG. 14A is a left side elevational view of the seating assembly in a standing position with the pawl assembly in the disengaged position during manual actuation, according to an aspect of the disclosure.
Figure 14B:
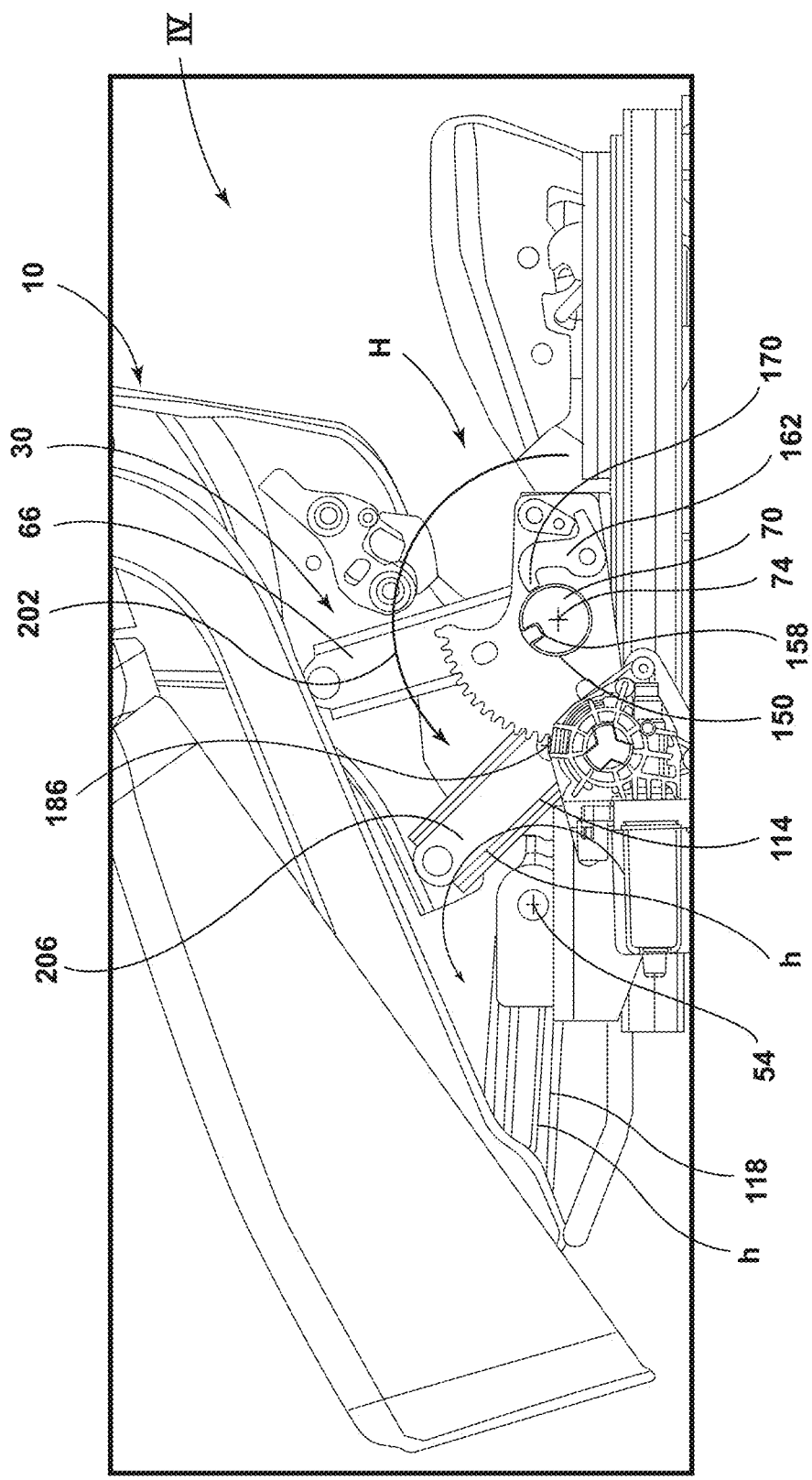
FIG. 14B is left side elevational view of the lift mechanism portion of the seating assembly in the disengaged position of FIG. 14A, according to an aspect of the disclosure.

FIGS. 14A-14B show the seating assembly 10 in a standing position IV. The shaft 70 of the linkage assembly 30 has rotated to move the recess 158 of the shaft 70 further away from the detent 170. The rear link 66 of the linkage assembly 30 has moved from the second intermediate collapsed position G to the extended position H. The shaft 70 has rotated around the axis of rotation 54 in the direction shown by arrow 206 to rotate the front link 118 around the axis of rotation 54 in the direction shown by arrow 206 from the second intermediate collapsed position g to the extended position h. The middle link 114 has rotated around the axis of rotation 186 from the second intermediate collapsed position g to the extended position h.

Referring to FIGS. 15-18, additional views of the lift mechanism 18 are shown. The pawl assembly 22A, the pawl 162A, the cam 166A, and the shaft 70A shown in FIGS. 15-18 may have design variations from the pawl assembly 22, the pawl 162, the cam 166, and the shaft 70 shown in FIGS. 1-14.

Figure 15:
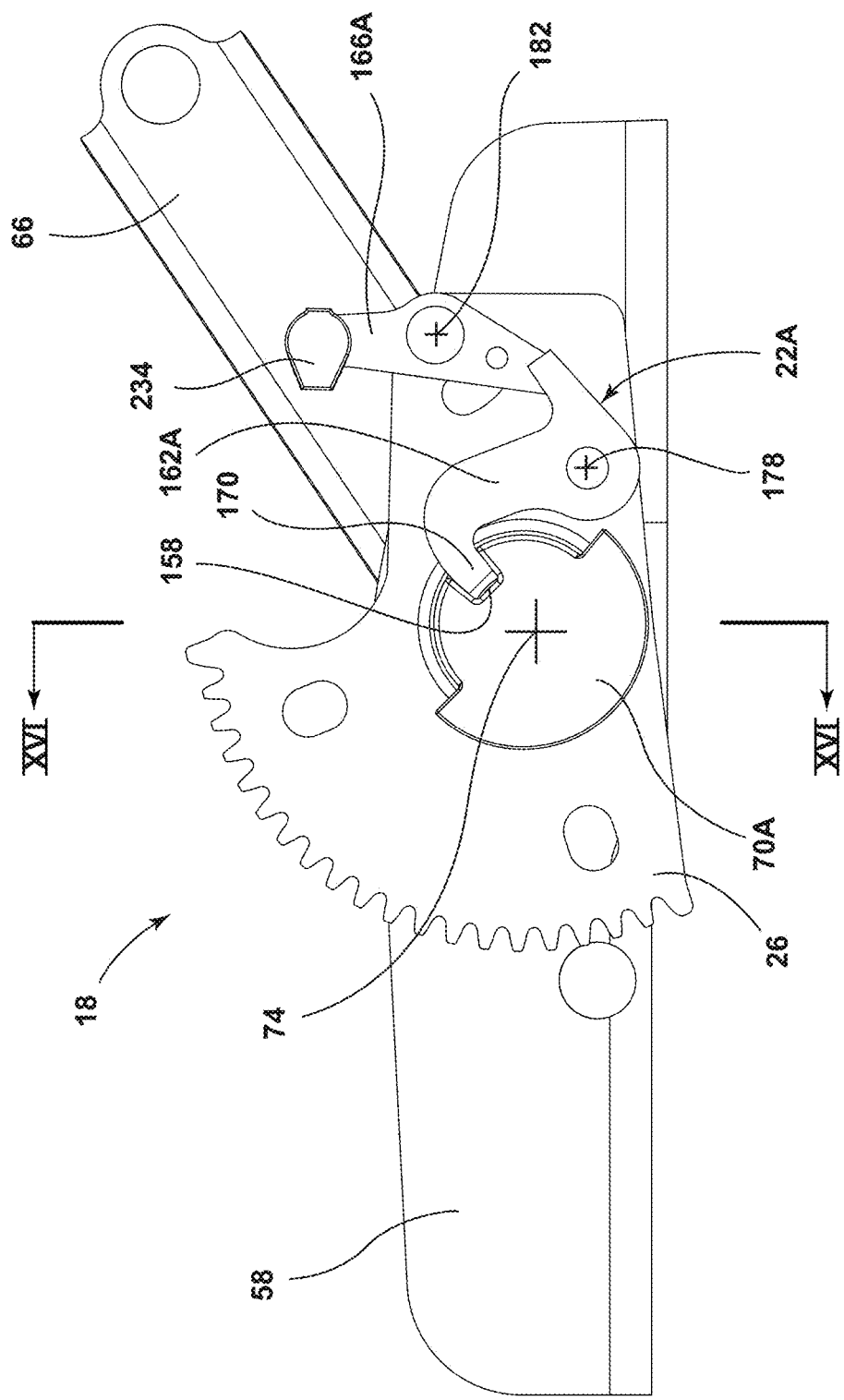
FIG. 15 is a left side elevational view of the pawl assembly in the engaged position, according to an aspect of the disclosure.

With reference to FIG. 15, a side elevational view is shown of the lift mechanism 18. The lift mechanism 18 may include cable assembly attachment 234, which may be coupled to the cable assembly 218 shown in FIGS. 10A and 10B.

Figure 16:
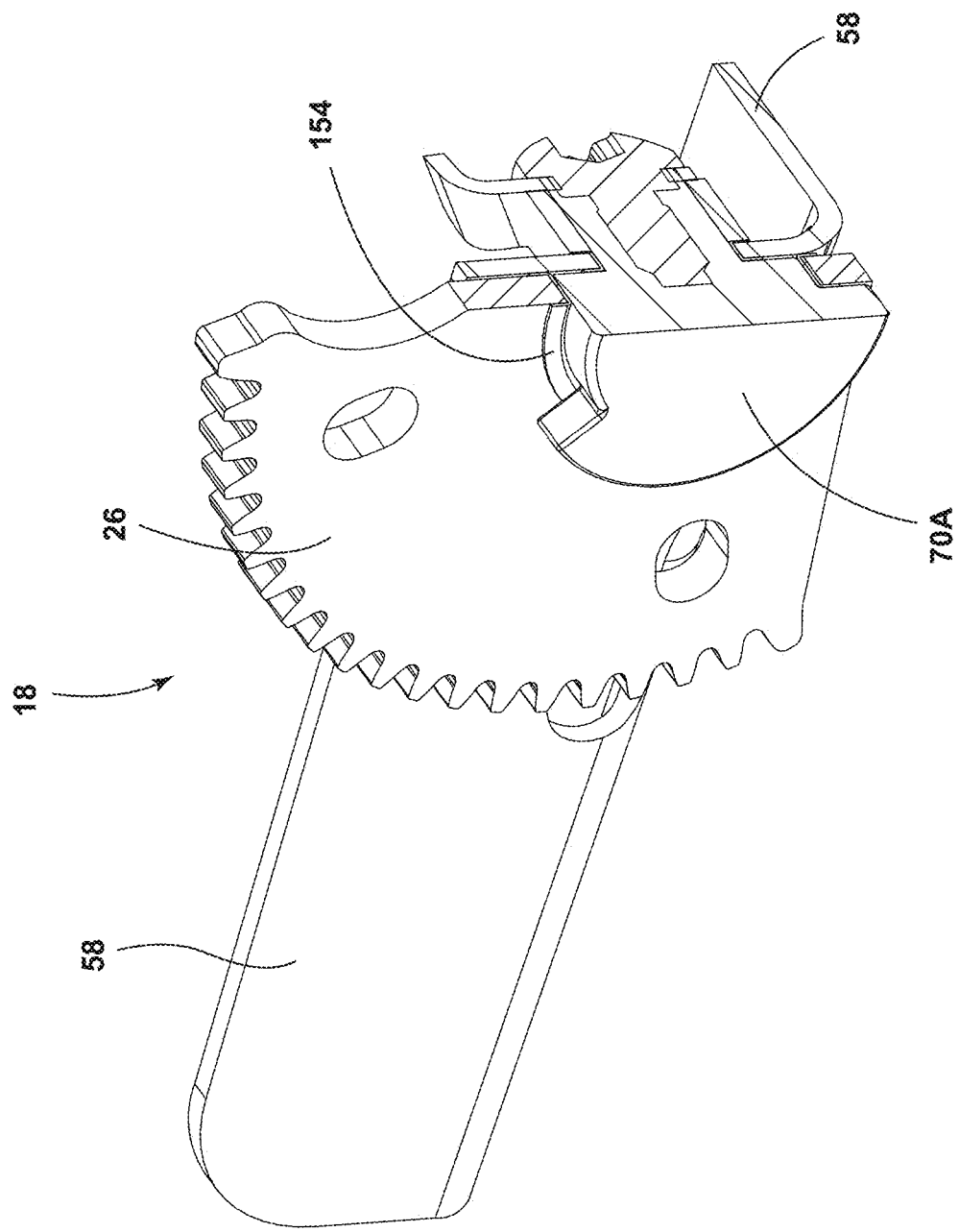
FIG. 16 is a side perspective view of the shaft, the sector gear, and the pivot bracket with a cross section taken along the line XVI-XVI of FIG. 15.

Referring to FIG. 16, a cross-sectional view of the shaft 70A, the sector gear 26, and the pivot bracket 58 taken along the line XVI-XVI of FIG. 15 is shown. The shaft 70A extends through the sector gear 26 and the pivot bracket 58.

Figure 17:
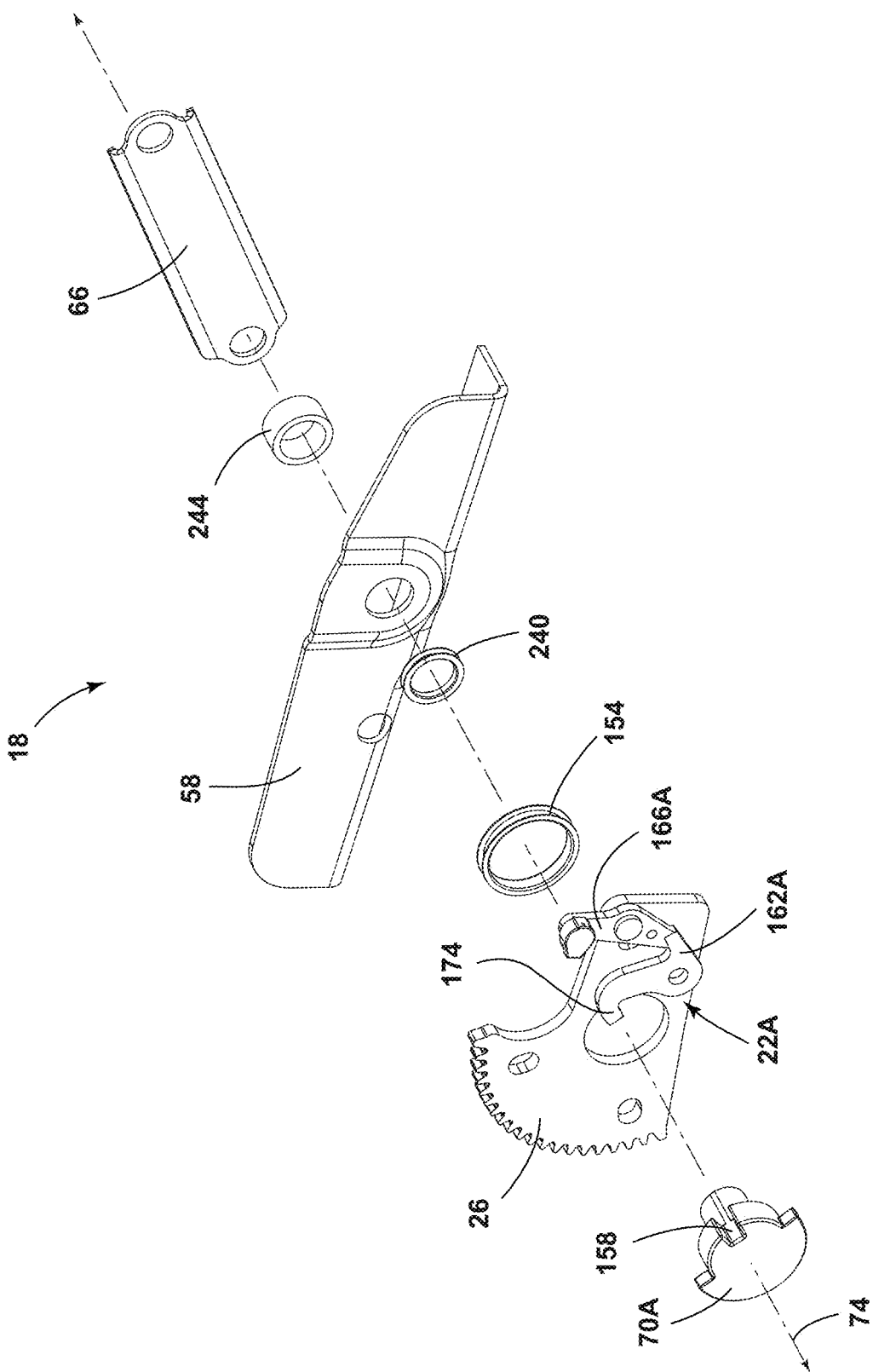
FIG. 17 is a left side exploded view of the shaft, the sector gear, the pivot bracket, and the rear link, according to an aspect of the disclosure.
Figure 18:
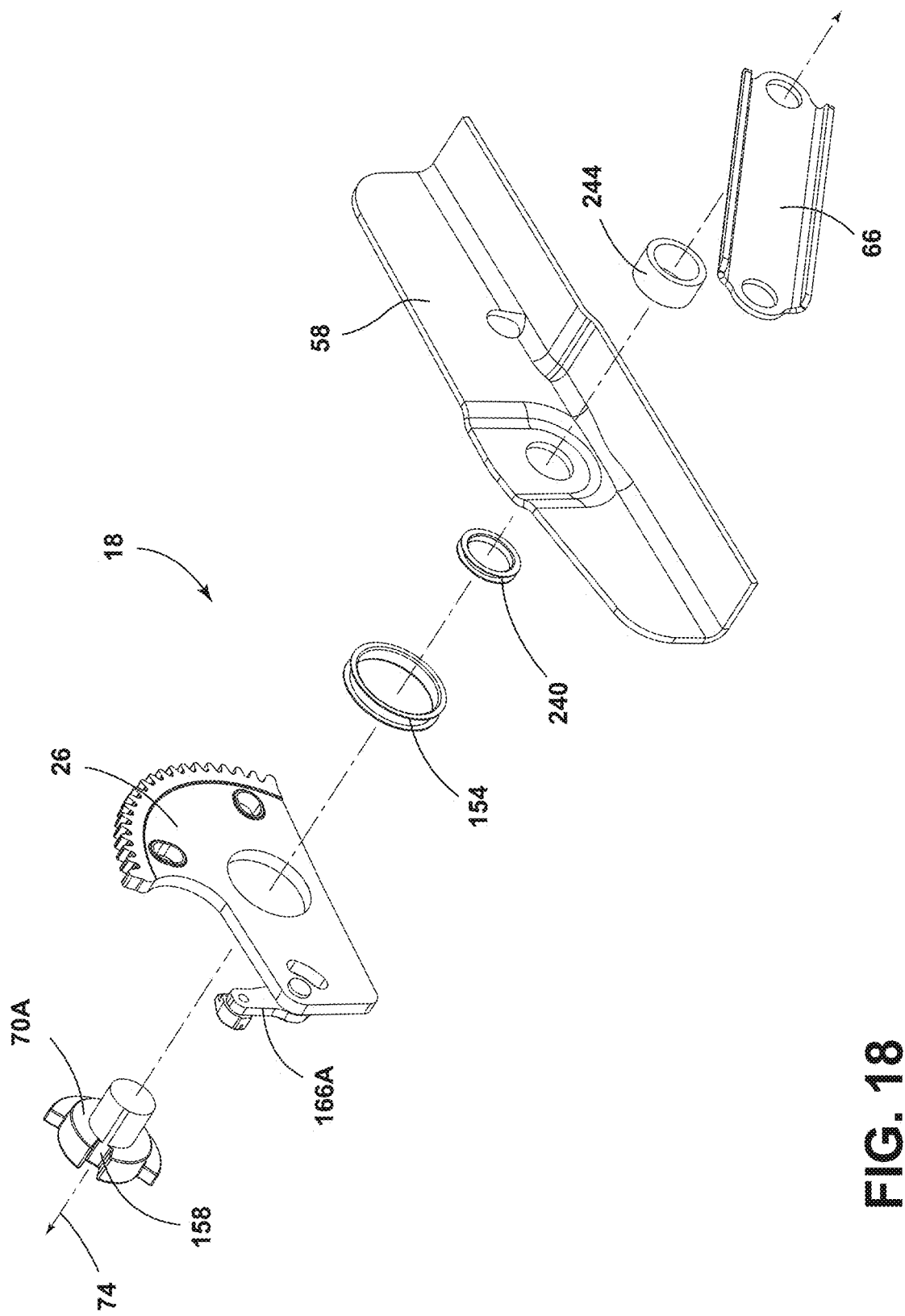
FIG. 18 is a right side exploded view of the shaft, the sector gear, the pivot bracket, and the rear link, according to an aspect of the disclosure.

Referring to FIGS. 17-18, an assembly view of the lift mechanism 18 shows the shaft 70A positioned to extend through the sector gear 26, the pivot bracket 58, the ring 244, and the rear link 66. The bushing 154 may be disposed between the sector gear 26 and the shaft 70A. The bushing 240 may be disposed between the shaft 70A and the pivot bracket 58.

With continued reference to FIGS. 17-18, it should be understood that the bushing 154 disposed between the shaft 70A and the sector gear 26 may be designed to minimize the amount of friction between the shaft 70A and the sector gear 26 so that the shaft 70A may easily rotate within the sector gear 26 if the pawl assembly 22A is in the disengaged position B to move the seating assembly 10 from the sitting position I to the standing position IV. Similarly, the bushing 240 may be disposed between the shaft 70A and the pivot bracket 58 so that the shaft 70A may easily rotate within the pivot bracket 58 if the pawl assembly 22A is in the disengaged position B to move the seating assembly 10 from the sitting position I to the standing position IV. The bushings 154 and 240 may be made of Norglide® or a similar material. The bushings 154 and 240 may be metal-reinforced, self-lubricating plain bushings with a layer of low PTFE (polytetrafluoroethylene) compound. Bushings 154 and 240 may minimize noise and vibration between the shaft 70A and the sector gear 26 and the shaft 70A and the pivot bracket 58, respectively.

Figure 20:
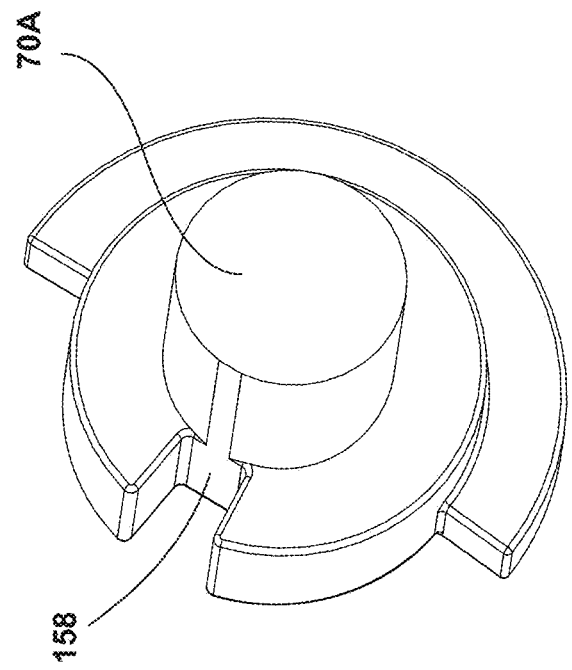
FIG. 20 is a rear perspective view of the shaft of FIG. 19.
Figure 19:
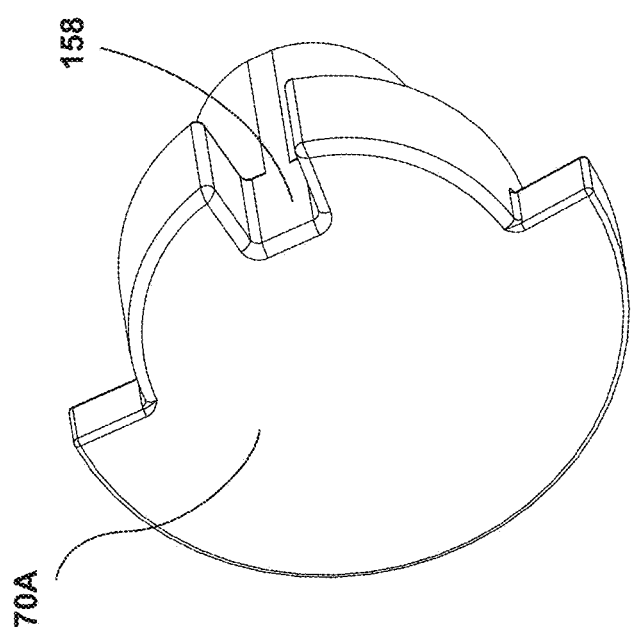
FIG. 19 is a front perspective view of the shaft, according to an aspect of the disclosure.

Referring now to FIGS. 19-20, additional views of the shaft 70A are shown. The shaft 70A may include varying cross sections along its length designed for interfacing with the lift mechanism 18 components that the shaft 70A extends through. The shaft 70A may include a recess 158 for receiving the detent 170 of the pawl 162A.

A variety of advantages may be obtained from the present disclosure. A passenger may conveniently move a seating assembly 10 between a sitting position I and a standing position IV by using a power actuator 110. The passenger may also conveniently move the seating assembly 10 between a sitting position I and a standing position IV by using manual actuation. The axis of rotation 74 of the lift mechanism 18 may be the same for powered actuation and manual actuation, thereby preserving space in the seating assembly 10. The bushing 154 disposed about the shaft 70 that may define the axis of rotation 74 may be made of a low friction material to provide for easier manual actuation and movement of the seating assembly 10 between the sitting position I and the standing position IV.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle seating assembly, comprising:
 a frame movable between a sitting position and a standing position, pivotably coupled to a vehicle floor at a pivotable coupling defining a first axis of rotation;
 a pivot bracket coupled to the vehicle floor;
 a linkage assembly including:
  a link extending between the pivot bracket and the frame; and
  a shaft extending through the pivot bracket and the link in a direction transverse to the link, and defining a second axis of rotation;

a gear assembly including:
    a sector gear rotationally coupled to the shaft; and
    a pinion gear operable to move the sector gear from a first position to a second position; and
a pawl assembly coupled to the sector gear and selectively engageable with the shaft such that if the pawl assembly is an engaged position, the shaft is in a fixed position relative to the sector gear and if the pawl assembly is in a disengaged position, the shaft is in an unfixed position relative to the sector gear.

2. The vehicle seating assembly of claim 1, wherein the pawl assembly includes a pawl pivotably coupled to the sector gear and a cam pivotably coupled to the sector gear, wherein a pivotable coupling between the pawl and the sector gear defines a third axis of rotation, and wherein a pivotable coupling between the cam and the sector gear defines a fourth axis of rotation.

3. The vehicle seating assembly of claim 2, further comprising:
    a powered actuator coupled to the pinion gear for moving the sector gear between the first position and the second position while the pawl assembly is in the engaged position to move the frame between the sitting position and the standing position, respectively.

4. The vehicle seating assembly of claim 3, further comprising:
    a manual actuator coupled to the pawl assembly and configured to exert an actuating force on the pawl assembly to move the pawl assembly from the engaged position to the disengaged position and to move the shaft and the link from the fixed position to the unfixed position, respectively.

5. The vehicle seating assembly of claim 4, wherein the manual actuator includes a cable assembly.

6. The vehicle seating assembly of claim 1, wherein the shaft extends through a hole in the sector gear.

7. The vehicle seating assembly of claim 6, further comprising:
    a bushing disposed between the shaft and the hole in the sector gear.

8. The vehicle seating assembly of claim 1, wherein the pawl assembly and the link are disposed on opposing sides of the sector gear.

9. The vehicle seating assembly of claim 1, wherein the pivot bracket is slidably coupled to a rail disposed proximate the vehicle floor and wherein the frame in the standing position is slidable along the rail between an initial position and a final position.

10. The vehicle seating assembly of claim 2, wherein the shaft includes a recess for receiving a detent of the pawl when the pawl assembly is in the engaged position.

11. A lift mechanism for a vehicle seating assembly comprising:
    a linkage assembly disposed between a frame and a pivot bracket coupled to a vehicle floor, wherein the linkage assembly is movable between a collapsed position and an extended position to move the frame between a sitting position and a standing position, respectively;
    a gear assembly including:
        a pinion gear; and
        a sector gear coupled to the linkage assembly, wherein the sector gear is movable between a first position and a second position, and wherein if the linkage assembly is fixedly coupled to the sector gear, then movement of the sector gear from the first position to the second position moves the linkage assembly from the collapsed position to the extended position; and
    a pawl assembly coupled to the linkage assembly and the sector gear, wherein the pawl assembly is positionable in an engaged position or a disengaged position relative to the linkage assembly, wherein if the sector gear is in the first position, then the pawl assembly is in the disengaged position, and the linkage assembly is movable between a collapsed position and an extended position.

12. The lift mechanism for a vehicle seating assembly of claim 11, further comprising:
    a powered actuator rotationally coupled to the pinion gear.

13. The lift mechanism for a vehicle seating assembly of claim 12, further comprising:
    a manual actuator coupled to the pawl assembly.

14. The lift mechanism for a vehicle seating assembly of claim 13, wherein the frame is movable from the sitting position to the standing position by actuating the powered actuator or the manual actuator.

15. The lift mechanism for a vehicle seating assembly of claim 11, wherein the linkage assembly includes a link fixedly coupled to a shaft orthogonal to the link.

16. The lift mechanism for a vehicle seating assembly of claim 15, further comprising:
    a hole disposed in the sector gear, wherein the shaft extends through the hole, wherein the shaft is in a fixed position relative to the sector gear if the pawl assembly is in the engaged position, and wherein the shaft is in an unfixed position relative to the sector gear if the pawl assembly is in the disengaged position.

17. The lift mechanism for a vehicle seating assembly of claim 16, wherein the shaft defines an axis of rotation that the sector gear rotates about from the first position to the second position if the pawl assembly is in the engaged position.

18. A lift mechanism for a vehicle seating assembly comprising:
    a linkage assembly including:
        a shaft disposed through a sector gear and a pivot bracket and defining an axis; and
        a link extending transverse to the shaft and having:
            a first end coupled to the shaft; and
            a second end coupled to a seating assembly frame, wherein the shaft is rotatable between a collapsed position of the linkage assembly and an extended position of the linkage assembly to move the seating assembly from a sitting position to a standing position, respectively; and
    a pawl assembly coupled to the sector gear and positionable in an engaged position relative to the shaft when the linkage assembly is in a collapsed position and a disengaged position relative to the shaft when the shaft is in the extended position.

19. The lift mechanism for a vehicle seating assembly of claim 18, further comprising:
    a pinion gear coupled to the sector gear, wherein actuation of the pinion gear moves the sector gear between a first position and a second position, wherein if the pawl assembly is in the engaged position relative to the shaft, then a movement of the sector gear between the first position and the second position moves the seating assembly between the sitting position and the standing position, respectively.

20. The lift mechanism for a vehicle seating assembly of claim 19, further comprising:

a middle link having a first end coupled to the pivot bracket and a second end coupled to the seating assembly frame; and a front link having a first end coupled to the pivot bracket and a second end coupled to the seating assembly frame, wherein the middle link and the front link move between collapsed and extended positions as the seating assembly moves between a sitting position and a standing position.

* * * * *